3,341,539
FIBER-REACTIVE AND NON-REACTIVE SULFURIC ACID ESTERS OF LEUCO VAT DYESTUFFS
Max Staeuble, Basel, Switzerland, Hussein C. Sharaf, Cairo, Egypt, and Kurt Hoelzle, Liestal, and Ernst Jenny, Peter Stahel, Paul Ulrich, and Walter Oppliger, Basel, and Max Aeberli, Riehen, Switzerland, assignors to Ciba Limited, Basel, Switzerland, a company of Switzerland
No Drawing. Filed Sept. 1, 1964, Ser. No. 393,737
Claims priority, application Switzerland, Mar. 24, 1961, 3,518/61, 3,520/61, 3,521/61
9 Claims. (Cl. 260—249)

This application is a continuation in part of our co-pending application Ser. No. 123,987, filed July 14, 1961, now abandoned.

The class of dyestuffs normally termed sulfuric acid esters of leuco vat dyestuffs is a class so recognized as distinct from the vat dyestuff themselves. Many representatives of the said class have been in current use for many years. As is known, vat dyestuffs are normally applied to the fiber to be dyed (especially cellulosic fiber) in the reduced state wherein the keto groups, e.g. in an anthraquinone nucleus, are reduced to hydroxyl groups. This leuco stage of the vat dyestuffs is unstable to the oxidizing action of the air and thus the said leuco compounds are stable within the vat only, whereas exposure to the air causes rapid reoxidation. By contrast the sulfuric acid ester grouping attached to the hydroxyl groups obtained by reducing the vat dyestuff to its leuco stage, stabilizes the leuco compound to oxidation by the air, and thus the sulfuric acid esters of leuco vat dyestuffs can be used under conditions which are unsuitable for applying the vat dyestuffs themselves.

It is an object of the present invention to provide new sulfuric acid esters of leuco vat dyestuffs that are fiber-reactive, and this object appears to be fundamentally new.

It is a further object of the present invention to provide non-reactive new sulfuric acid esters of leuco vat dyestuffs which present a valuable enrichment of the art.

Other objects will appear as the specification proceeds.

This invention provides inter alia valuble new sulfuric acid esters of reactive leuco-vat dyestuffs, and provides more especially those which contain in the dyestuff molecule on a reactive grouping at most one unsubstituted leuco-anthraquinone sulfuric acid ester radical consisting of three fused rings.

As reactive vat-dyestuffs there are to be understood vat dyestuffs which contain a reactive substituent which enables the dyestuff to be fixed chemically on cellulose or enables the dyestuff to react chemically with itself under the action of heat and an alkali. As such substituents there may be mentioned, for example, an epoxy, ethyleneimide, vinylsulfone, acrylic group, an aliphatically or aromatically bound thiosulfuric ester grouping or a labile substituent capable of splitting off with the taking over of the electron pair of the bond. The dyestuff molecule may contain more than one such substituent.

As labile substituents capable of splitting off with the taking over of the electron pair of the bond there may be mentioned, for example, aliphatically bound sulfonyloxy groups, for example, an aliphatically bound HO—SO$_2$—O- group, or an aliphatically bound halogen atom, especially a chlorine atom. These labile substituents are advantageously present in the γ- or β-position of an aliphatic radical which is bound to the dyestuff molecule directly or through an amino group or an —SO$_2$-group or to the nitrogen atom of a carboxylic acid amide group or sulfonic acid amide group. In the case of those dyestuffs which contain a halogen atom as a labile substituent, this exchangeable halogen atom may also be bound in an aliphatic acyl radical, for example, an acetyl radical or in the β-position of a propionyl radical or advantageously in a heterocyclic radical. In this preferred form of the invention there are, therefore, included vat-dyestuffs which contain a labile chlorine atom bound to a heterocyclic radical, for example, a pyridazine, pyrimidine or phthalazine or more specially a triazine ring.

The term "vat-dyestuff" means dyestuffs which can be converted by reduction into a leuco or vatted form, and which possess in the reduced form a better affinity for natural or regenerated cellulose fibers than in the non-reduced form, and which dyestuffs in the reduced form can be oxidized to regenerate the original chromoforic system. As vat dyestuffs there are especially suitable those of the anthraquinone series, for example, those which contain an unmodified 9:10-dioxoanthracene ring, and also anthraquinones which contain fused carbocyclic or heterocyclic rings or consist of a plurality of anthraquinone units, for example, dyestuffs of the anthraquinone, dibenzanthrone, isodibenzanthrone, anthrimide or dibenzpyrene-quinone series, and also vat dyestuffs of the indigo or pyrene-quinone series. In addition to at least one reactive substituent of the kind defined above, the dyestuffs may contain substituents that are customary in vat dyestuffs, for example, halogen atoms, alkoxy groups, acylamino groups or arylamino groups. In certain cases the presence of hydrophilic groups, such as phosphato groups and especially sulfonic acid groups, thiosulfate groups or sulfato groups, may be of advantage.

The invention also provides a process for the manufacture of the aforesaid sulfuric acid esters of reactive leuco-vat dyestuffs, wherein a sulfuric acid ester of a leuco-vat dyestuff or leuco-vat dyestuff intermediate product containing at least one acylatable amino group is condensed with an acylating agent which contains, in addition to the acylating group, a reactive substituent of the kind defined above.

Acylating agents suitable for use as starting materials in the process of the invention are therefore compounds which contain at least two reactive positions, of which one is reacted with the amino group of the sulfuric acid ester to be acylated and the other remains in the resulting reactive sulfuric acid ester for subsequent reaction. As such acylating agents there may be mentioned polyhalogenated heterocycles and acid halides or anhydrides, which in addition to the acid halide or anhydride group contain one or more reactive substituents. There may be mentioned, for example, cyameluric acid chloride or bromide, cyanuric bromide, cyanuric chloride and mono-condensation products of these trihalides with alcohols, phenols, mercaptans, ammonia or amines, and especially sulfoaryl-amines which may or may not possess dyestuff character, 2:4:6-trichloropyrimidine,
2:4:6-tribromopyrimidine,
2:4:5:6-tetrachloropyrimidine,
2:4-dichloro-6-methylpyrimidine,
2:4-dichloro-5-nitropyrimidine,
2:4-dichloro-5-nitro-6-methylpyrimidine,
2:4:6-trichloro-5-nitropyrimidine,
2:6-dichloropyrimidine-4-carboxylic acid chloride,
2:6-dichloropyrimidine-5-sulfonic acid chloride,
2:4-dichloropyrimidine-5-sulfonic acid,
2-(3'- or 4'-carboxyphenylamino)-4:6-dichloropyrimidine,
2-(3'- or 4'-carboxyphenylamino)-4:6:5-trichloropyrimidine or the compounds of the formulae

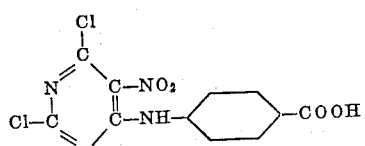

and

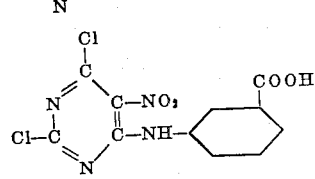

and also tetrachloro-pyridazine, dichloroquinoxaline, β-chloropropionic acid halides, acrylic anhydride, acrylic acid chloride, α:β-dichloro- or -dibromopropionic anhydride, α:β-dichloro- or -dibromo-propionic acid chloride, and also acid halides, acid anhydrides and halogenated heterocycles which contain a radical of the formula

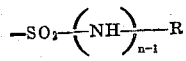

in which $n$ represents the whole number 1 or 2, and R represents a β-halogen-alkyl group or a thiosulfate radical bound through an aliphatic chain which may be interrupted by hetero-atoms, or represents a sulfonylated β-hydroxyalkyl group. As sulfonylated hydroxyalkyl groups there are to be understood hydroxyl groups which are bound to an alkyl chain that may be interrupted by hetero atoms, and which hydroxyl group is esterified with an organic acid or more especially with sulfuric acid. R advantageously represents a radical of the formula $$—CH_2—CH_2—halogen$$

or

in which halogen is, for example, a bromine atom, but preferably a chlorine atom, and $n$ is the whole number 1 or 2.

As acylating agents of the above kind there may be mentioned the compounds of the formulae

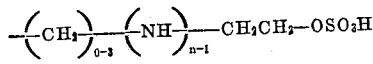

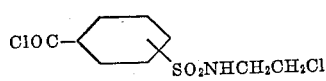

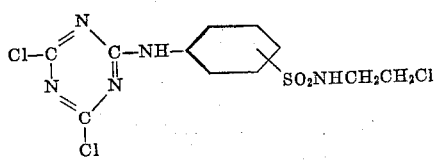

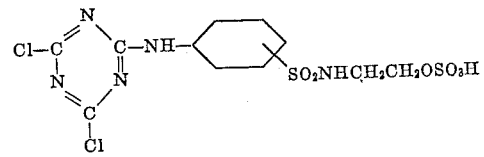

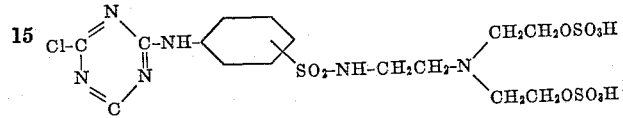

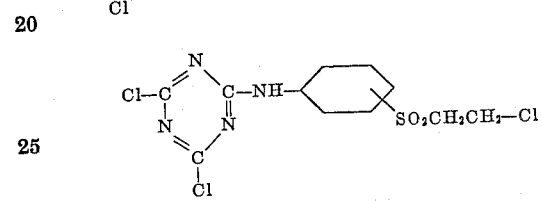

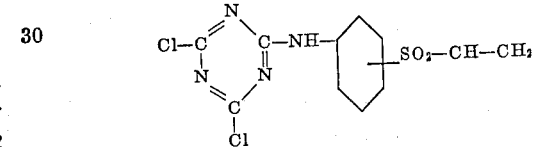

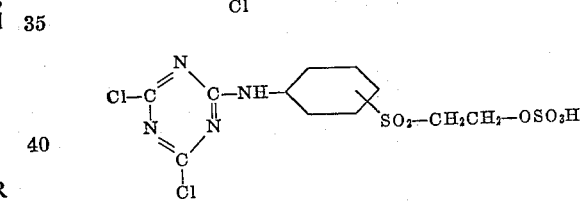

and corresponding derivatives containing a di- or tri-chloropyrimidine radical instead of the dichloro-triazine radical, and also compounds of the formula

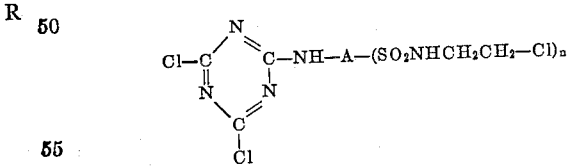

or

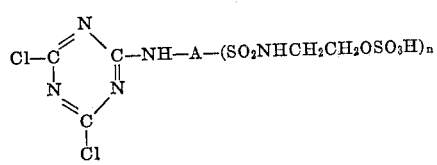

in which A represents an anthraquinone radical or the radical of a polycyclic quinone, and $n$ represents a whole number from 1 to 4.

The acylation with the aforesaid acylating agents containing a dichlorotriazine ring can also be carried out by first reacting cyanuric chloride with a sulfuric acid ester of a leuco-derivative containing an acylatable amino group in the molecular ratio 1:1 and then reacting the resulting dichlorotriazine condensing product with one molecular proportion of one of the compounds of the formulae

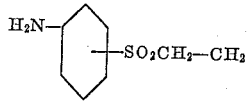

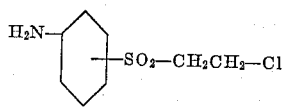

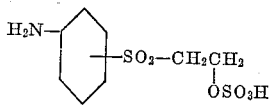

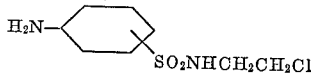

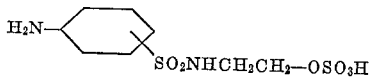

in which A and n have the meanings given above.

There can also be obtained by reacting a dichlorotriazine-containing sulfuric acid ester of a leuco-deriavtive with a dyestuff containing an amino group, for example, such a dyestuff of the azo-series, but preferably of the anthraquinone, phthalocyanine or peridicarboxylic acid imide series, new types of dyestuffs having interesting dyeing properties, and which contain a position that is reactive with fibrous materials or with itself. When such dyestuffs contain, in addition to the esterified leuco-component, a non-esterified vattable component, they can be used for dyeing in the presence of a reducing agent, such as sodium dithionite, thiourea dioxide, sodium sulfide or glucose, and in this case they generally exhibit an enhanced affinity.

The reaction of the aforesaid acylating agents with the sulfuric acid esters containing amino groups can be carried out in an inert organic solvent, for example, nitrobenzene, chlorobenzene or ortho-dichlorobenzene at a raised temperature. In many cases it is of advantage to carry out the reaction in an aqueous medium, advantageously in the presence of an acid-binding agent, for example, sodium acetate, sodium hydroxide or sodium carbonate. The molecular ratio of the components is advantageously so chosen that for each acylatable amino group of the sulfuric acid ester to be condensed at least sufficient acylating agent is used to form a reactive sulfuric acid ester, that is to say one which contains a grouping capable of reacting with cellulose with the formation of a covalent bond or with itself. When unsubstituted aminoanthraquinones are used it is of advantage so to choose the molecular ratio that a product is obtained which contains for each reactive grouping at most one unsubstituted leuco-anthraquinone sulfuric acid ester radical consisting of three fused rings.

By the process of the invention there can be obtained, for example, sulfuric acid ester salts of leuco-vat dyestuffs of the anthraquinone series, which as free acids, correspond to the general formula

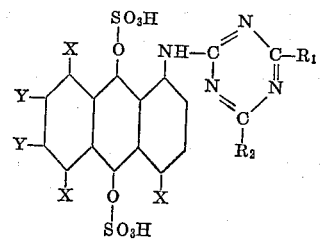

(I)

in which each of the radicals X represents a hydrogen atom or a chlorine atom or an —NH-aroyl radical, each of the radicals Y represents a hydrogen atom or a chlorine atom and $R_1$ represents a chlorine atom, and $R_2$ represents a chlorine atom or an —$NH_2$—, —NH-alkyl, —N(alkyl)$_2$—, —NH-cyclohexyl-, —NH-aryl, —O-alkyl or —O-aryl radical, or the phenyl group, piperidine or morpholine radical, the radicals X and the radicals Y being identical or different radicals, provided that at least 6 hydrogen atoms are bound directly to carbon atoms of the anthracene nucleus and that the term "alkyl" denotes a lower alkyl radical containing 1 to 6 carbon atoms, can be obtained by reacting in the molecular ratio 1:1 a compound of the general formula

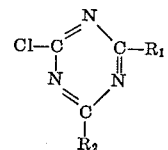

(II)

in which $R_1$ and $R_2$ have the meanings given above, with a compound which, in the form of the free acid, corresponds to the general formula

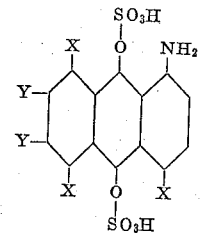

(III)

in which each of the radicals X and Y have the meanings given above, and at least 6 hydrogen atoms are bound directly to carbon atoms of the anthracene nucleus, the reaction being carried out in an aqueous medium and in the presence of an agent binding mineral acid.

The 1-amino-anthraquinones from which the sulfuric acid ester salts of the general Formula III are derived may be, for example, 1-amino-anthraquinone,
1-amino-4-, -5-, -6-, -7- and -8-chloranthraquinones,
1-amino-4-, -5- and -8-benzoylaminoanthraquinones,
1-amino-4-, -5- and -8-(chlorbenzoylamino)-anthraquinones, and
1-amino-4-, -5- and -8-(4'-phenylbenzoylamino)-anthraquinones.

Suitable compounds of the Formula II are 2:4:6-trichlorotriazine and monosubstitution products thereof in which the radical $R_2$ has the meaning given above, for example, 2:4-dichloro-6-phenyl-triazine. The compounds that provide the radical $R_2$ are, for example, the following amines: methylamine, ethylamine, n-propylamine, isopropylamine, n-butylamine, n-amylamine, n-hexylamine, cyclohexylamine, 1:3-dimethyl-butylamine, dimethylamine, diethylamine, dibutylamine, diamylamine, dihexylamine, piperidine, morpholine, aniline, monochloraniline, nitranilines, and also the following alcohols: methyl alcohol, ethyl alcohol, n-propyl alcohol, isopropyl alcohol, n-butyl alcohol, 2-ethyl-n-butyl alcohol, n-hexyl alcohol and phenol.

Furthermore, for example, sulfuric acid ester salts of leuco-vat dyestuffs of the anthraquinone series, which in the form of the free acids correspond to the following general formula

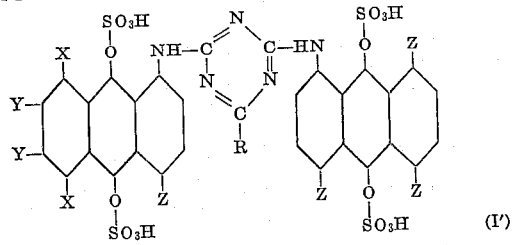

in which each symbol X represents a hydrogen atom or chlorine atom or an —NH-aroyl radical, each symbol Y represents a hydrogen atom or chlorine atom, one of the symbols Z represents the —NH-aroyl radical and the other two symbols Z represents hydrogen atoms and the symbol R represents a chlorine atom, the symbols X or the symbols Y having identical or different meanings, provided that at least 6 hydrogen atoms are bound directly to carbon atoms of each anthracene nucleus, and that the term "alkyl" means a lower alkyl radical containing 1 to 6 carbon atoms, can be obtained by reacting cyanuric chloride or cyanuric bromide in either order of succession with one molecular proportion of a compound which, in the form of the free acid, corresponds to the general formula

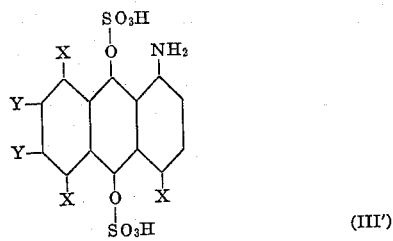

in which each of the symbols X and Y have the meanings given above provided that at least 6 hydrogen atoms are bound directly to carbon atoms of the anthracene nucleus, and with one molecular proportion of a compound which, in the form of the free acid, corresponds to the general formula

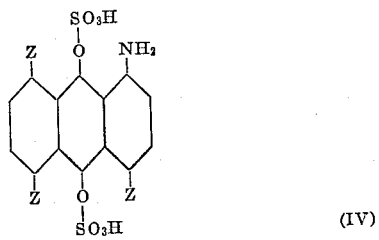

in which each of the symbols Z has the meanings given above, and at least 6 hydrogen atoms are bound directly to carbon atoms of the anthracene nucleus, the reactions being carried out in an aqueous medium and in the presence of an acid capable of binding mineral acid.

The sulfuric acid ester salts of the general Formula III' may be derivatives of the following 1-amino-anthraquinones:

1-aminoanthraquinone,
1-amino-4-, -5-, -6-, -7- or -8-chloroanthraquinone,
1-amino-4-, -5- or -8-benzoylaminoanthraquinone,
1-amino-4-, -5- or -8-chlorobenzoylaminoanthraquinone or
1-amino-4-, -5- or -8-(4'-phenylbenzoylamino)-anthraquinone.

1-amino-anthraquinones from which the compounds of the Formula IV are derived are, for example,
1-amino-4-, -5- or -8-benzoylaminoanthraquinone,
1-amino-4-, -5- or -8-chlorobenzoylaminoanthraquinone, and
1-amino-4-, -5- or -8-(4'-phenylbenzoylamino)-anthraquinone.

Sulfuric acid esters containing two reactive substituents are obtained, for example, by reacting leuco-1:4-, 1:5-, or -1:8-, diamino anthraquinonyl sulfuric acid diesters with at least two molecular proportions of cyanuric chloride or syanuric bromide or of a dihalogen-triazine, for example, 4:6-dichloro-2-phenyl-, -2-methoxy-, -2-phenoxy-2-phenylamino-, -2-morpholino-, -2-piperidine-, -2-dimethylamino-, -2-sulfophenylamino-, -2-isopropylamino- or -2-hexylamino-1:3:5-triazine.

Especially valuable are the sulfuric acid ester salts of leuco-vat dyestuffs of the anthraquinone series which, in the form of the free acids, correspond to the general formula

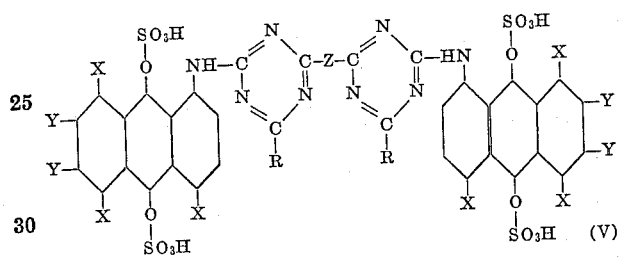

in which each of the symbols X represents a hydrogen or chlorine atom or an —NH-aroyl radical, each of the symbols Y represents a hydrogen or chlorine atom, the symbol R represents a halogen atom, and Z represents the radical of a diamine, the symbols X or the symbols Y being identical or different from each other, and in which at least 6 hydrogen atoms are bound directly to carbon atoms of each anthracene nucleus, and the term "alkyl" means alkyl radicals containing 1 to 6 carbon atoms.

As radicals Z there may be mentioned, for example, the radicals of hydrazine, ethylenediamine, 1:3- and 1:4-diaminobenzene, benzidine, chlorobenzidine, tolidine, di-anisidine, 4:4'-diamino-diphenyl-methane, 4:4-diaminostilbene, 4:4'-diaminobenzophenone, 4:4'-diamino-diphenylsulfone, 4:4'-diamino-diphenylamine, 4:4'-diamino-diphenyl-urea, 1-amino-4-(4'-aminobenzoyl)-aminobenzene, 1:4-, 1:5- or 1:8-diaminoanthrahydroquinonyl-disulfuric acid esters or vattable amines. These sulfuric acid esters can be made by the process of this invention by condensing cyanuric chloride or cyanuric bromide with a compound which, in the form of the free acid, corresponds to the general formula

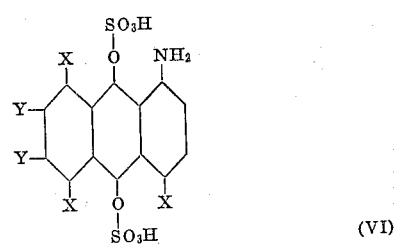

in which symbols X and Y have the meanings given above, and in which at least 6 hydrogen atoms are directly bound to carbon atoms of the anthracene nucleus, to form a dihalogen-triazine derivative, two such dihalogen-triazines are condensed by means of a diamine to form a bis-monohalogen-triazine of the Formula V. The condensation may be carried out, for example, in an aqueous medium and in the presence of an agent capable of binding mineral acid.

As sulfuric acid ester salts of the Formula VI there may be mentioned more especially those referred to above and as diamines, for example, the following: hydrazine, ethylenediamine, 1:3- and 1:4-diaminobenzene, benzidine, chlorobenzidine, tolidine, dianisidine, 4:4'-diaminodiphenylmethane, 4:4'-diaminostilbene, 4:4'-diaminobenzophenone, 4:4'-diaminodiphenylsulfone, 4:4'-diaminodiphenylamine, 4:4'-diaminodiphenyl-urea, 1-amino-4-(4'-aminobenzoyl)-aminobenzene, and also 1:4-, 1:5- and 1:8-diaminoanthrahydroquinonyl disulfuric acid esters.

If desired, the sequence of the condensations may be varied, for example, the diamine may first be converted into a bis-halogen-triazinylamino-compound, which is subsequently reacted with two molecular proportions of the sulfuric acid ester salt, for example, with the lithium, sodium, potassium, ammonium or triethanolamine salt of the ester of the Formula VI.

The sulfuric acid esters of leuco-vat dyestuffs obtained by the process, if they still contain acylatable amino groups, may be further acylated with the usual acylating agents especially with aromatic carboxylic acid halides. They are suitable for dyeing a very wide variety of materials, such as wool (for example, very strongly or weakly acid baths), polyamide fibers, and especially for dyeing or printing textile materials of natural or regenerated cellulose by the so-called direct or exhaustion dyeing method and also by printing methods or the padding method, in which the dyestuff applied to the fiber is chemically fixed thereon by treatment with an alkali and heat, for example, by steaming, if desired, in the presence of a reducing agent, or by dry fixing with or without intermediate drying in a current of hot dry air or in infra red rays, for example, at 120 to 200° C.

Dyeing with the new sulfuric acid ester leuco-vat dyestuffs is considerably simplified in that the dyeings can be soaped immediately after the dyeing process, whereby non-fixed dyestuff is removed and only chemically fixed dyestuff, which has a good fastness to solvents and migration, remains on the fiber. It has also been observed that in the case of leuco-derivatives that can be easily developed, re-oxidation to form the dyestuff is complete during the soaping operation at the boil, so that development with an acid oxidizing agent, for example, nitrite and sulfuric acid, such as is otherwise usual for dyeings with sulfuric acid esters of leuco-vat dyestuffs, is not the critical step leading to the fixation of the dyestuff, although it may be useful for developing the full shade.

The dyeings and prints produced with the dyestuffs of the invention are distinguished by their excellent fastness to light and properties of wet fastness. As these dyestuffs, in contradistinction to the conventional vat dyestuffs, are substantially impossible to dissolve from the fiber by means of hot dimethyl-formamide, it must be supposed that the dyestuffs are chemically fixed on the fiber or have reacted therewith.

Dyeings produced with the dyestuffs of the invention are, therefore, fast to dry cleaning and migration. The dyed fabrics can therefore, be coated with artificial resins, for example, polyvinyl chloride, without the dyestuff migrating into the resin, which is especially important in the manufacture of artificial leather.

As the reactivity of the halogen atoms or sulfonylated hydroxyl groups may vary somewhat from dyestuff to dyestuff, it is of advantage to adjust the dyeing conditions accordingly, especially the concentration of the alkali and the duration and temperature of dyeing or steaming depending on the particular dyestuff used. The most favorable conditions can easily be determined by preliminary tests.

It is especially important from the point of view of their application that the reactive sulfuric acid esters of the invention in contradistinction to the conventional sulfuric acid esters of this kind known hitherto, have a good build up of shade and can be fixed fast on cellulose by a wide variety of methods, for example, exhaustion, pad-steaming, single bath-steam, cold-dwell, printing or padding methods with or without a reducing agent and with or without intermediate drying, if the fixing is to be carried out at a raised temperature.

The following examples illustrate the invention the parts and percentages being by weight unless otherwise stated, and the relationship of parts by weight to parts by volume being the same as that of the kilogram to the liter.

EXAMPLE 1

20 parts of ice are stirred into a solution of 1.9 parts of cyanuric chloride in 10 parts of acetone. The resulting suspension of cyanuric chloride is added to a solution, cooled to 0° C., of 4.3 parts of the disodium salt of 1-amino-anthraquinone sulfuric acid leuco ester in 100 parts of water, and the mineral acid liberated by the condensation is continuously neutralized at pH value of 6 to 7 with a total of 5.5 parts of 2 N-sodium carbonate solution. On completion of the condensation the whole is stirred on for ½ hour, the solution is then saturated with sodium chloride, kept overnight at 0° C. and the precipitated dyestuff is filtered off. The filter cake is rinsed with a small amount of a buffer solution containing 5 parts of disodium phosphate, 3 parts of monopotassium phosphate and 30 parts of sodium chloride in 200 parts of water, exhaustively expressed and dried in vacuum at 30 to 40° C.

The dyestuff of the formula

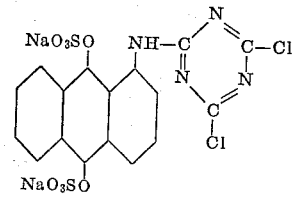

dyes cotton and regenerated cellulose by the method described below yellow shades of very good fastness, more especially to solvents and migration.

*Dyeing instructions*

A solution of 2 parts of the dyestuff in 2000 parts of cold water is treated with 100 parts of a sodium carbonate soultion of 10% strength and 250 parts of a sodium chloride solution of 20% strength. 100 parts of well wetted cotton yarn are introduced in this dyebath at 20 to 30° C., and after 30 minutes another 250 parts of a sodium chloride solution of 20% strength are added. Dyeing is continued for 60 minutes at 25 to 35° C. The dyed yarn is then rinsed in cold water, soaped at 80 to 100° C., thoroughly rinsed in cold water, developed in usual manner in an acidic oxidizing bath at 40 to 50° C. and finished. A yellow dyeing of very good fastness properties is obtained.

EXAMPLE 2

20 parts of ice are stirred into a solution of 1.9 parts of cyanuric chloride in 15 parts of acetone. The resulting cyanuric chloride suspension is added to a solution, cooled to 0° C., of 4.6 parts of the disodium salt of 2-amino-3-chloroanthraquinone sulfuric acid leuco ester in 100 parts of water, and the mineral acid liberated during the condensation is continuously neutralized at 0–3° C. and a pH value of 5 to 7 with a total of about 5.5 parts of 2 N-sodium hydroxide solution. On completion of the reaction, a solution of 3.9 parts of the condensation product from perylene-tetracarboxylic acid anhydride and 1:4-diaminobenzene-2-sulfonic acid in the molecular ratio of 1:2 in the form of the disodium salt, in 200 parts of water, is added and the temperature is raised to 40° C. Correspondingly to the eliminated hydrochloric acid the whole is neutralized at a pH value of 6 to 7 with a total of 5.5 parts of 2 N-sodium carbonate solution, and the red dyestuff solution is then treated with sodium chloride. The new dyestuff of the formula

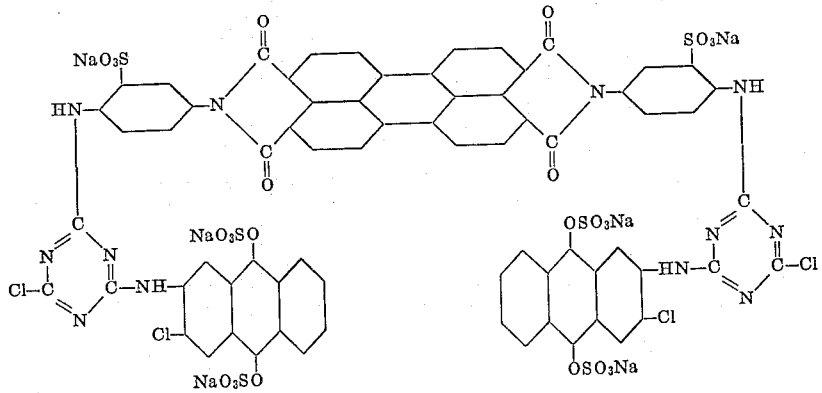

is filtered off, washed with the buffer solution described in Example 1 and dried in vacuum at 40° C.

The new dyestuff dyes cotton and regenerated cellulose by the method described below under A (Thermofixation Method) pure yellowing red shades having very good properties of fastness, more especially excellent fastness to migration.

EXAMPLE 3

4.3 parts of the disodium salt of 1-amino-anthraquinone sulfuric acid leuco ester are condensed with cyanuric chloride as described in Example 1, and 15 parts of 2 N-ammonium hydroxide solution are then added at a rate such that the pH value does not exceed 9, while at the same time raising the temperature in the course of 1 hour to 40° C. The whole is stirred for another hour at 35 to 40° C., and the solution is saturated with sodium chloride and then cooled to 0° C. When the dyestuff has settled out completely, it is filtered off, washed with a small amount of buffer solution and dried in vacuum at 50° C. The dyestuff of the formula

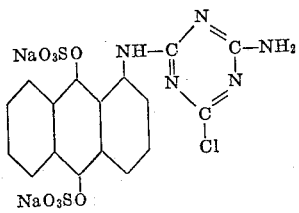

dyes cotton and regenerated cellulose by the method described below yellow tints having very good fastness properties.

A solution of 2 parts of the dyestuff in 100 parts of water is used to impregnate a cotton fabric to a weight increase of 75% and the impregnated fabric is then dried, impregnated with a solution having a temperature of 20° C. and containing per liter 10 grams of sodium hydroxide and 300 grams of sodium chloride, squeezed to a weight increase of 75%, steamed for 60 seconds at 100 to 101° C., rinsed, soaped with a boiling solution of a non-ionic detergent, thoroughly rinsed in cold water and developed at 40 to 50° C. in usual manner in an acidic oxidizing bath. A yellow shade is obtained which has excellent fastness properties.

EXAMPLE 4

4.6 parts of the disodium salt of 2-amino-3 - chloro-anthraquinone sulfuric acid leuco ester are condensed with cyanuric chloride as described in Example 2, and a solution of 3.4 parts of the sodium salt of 1:4-diamino-anthraquinone-2-sulfonic acid in 50 parts of water is added. The whole is heated to 40° C., and the liberated mineral acid is neutralized at pH=6.5 to 7 with about 5 parts of 2 N-sodium carbonate solution. When the pH value remains constant for about 2 hours, the blue solution is saturated with sodium chloride, allowed to cool to room temperature, and the precipitated dyestuff of the formula

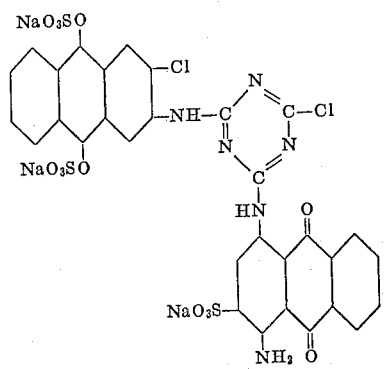

is filtered off, washed with a small amount of buffer solution as described in Example 1 and dried in vacuum at 40° C.

The new dyestuff dyes cotton and regenerated cellulose by the method described in the last paragraph of this example pure, violet shades having very good fastness properties.

When in this example the 3.4 parts of the sodium salt of 1:4-diaminoanthraquinone-2-sulfonic acid are replaced by an equivalent amount of the disodium salt of 1-amino-4-(4' - amino-phenylamino)-anthraquinone - 2:3' - disulfonic acid, a dyestuff results which dyes cotton reddish blue shades.

2 parts of the dyestuff are dissolved in 100 parts of water, and this solution is used to impregnate a cotton fabric at 20° C. on a padder. The impregnated fabric is then squeezed to a weight increase of 75%, dried, then impregnated at room temperature with a solution containing per liter 10 grams of sodium hydroxide and 300 grams of sodium chloride, squeezed to a weight increase of 75%, steamed for 60 seconds at 100 to 101° C., rinsed, treated with a sodium bicarbonate solution of 0.5% strength, rinsed, soaped at the boil for 15 minutes, once more rinsed and then dried.

EXAMPLE 5

3.9 parts of the disodium salt of the condensation product from perylene-3:4:0:10-tetracarboxylic acid and 1:4-diaminobenzene-2-sulfonic acid in the molecular ratio of 1:2 are dissolved in 200 parts of water and treated at 0° C. with 1.9 parts of cyanuric chloride dissolved in 10 parts of acetone and precipitated in suspended form with 15 parts of ice. At a temperature of 0 to 4° C. a total of 10 parts by volume of N-sodium hydroxide solution is gradually added dropwise at a rate such that the pH value of the solution can be kept constant between 5.0 and 7.0. A solution of 4.3 parts of the disodium salt of 1-amino-anthraquinone sulfuric acid leuco ester in 50 parts of water is then run in and the temperature is slowly raised to 40° C.

Corresponding to the eliminated hydrochloric acid the whole is neutralized at a pH value of 6 to 7 with a total of 5.5 parts of 2 N-sodium carbonate solution, and the dyestuff solution is then saturated with sodium chloride. The new dyestuff of the formula

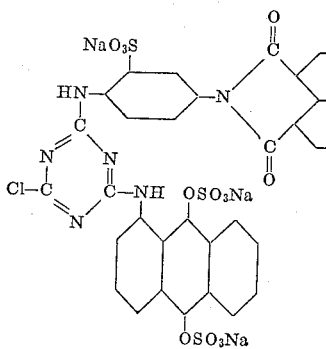

is filtered off, washed with buffer solution as described in Example 1 and dried in vacuum at 40° C.

The new dyestuff dyes cotton and regenerated cellulose by the method described under A (Thermofixation Method) red shades having very good fastness properties.

EXAMPLE 6

4.3 parts of the disodium salt of 1-amino-anthraquinone sulfuric acid leuco ester are condensed with cyanuric chloride as described in Example 1, and a solution of another 4.3 parts of 1-amino-anthraquinone sulfuric acid leuco ester salt in 50 parts of water is added. The temperature is raised to 40° C. and the mineral acid liberated during the condensation is neutralized with about 5.5 parts of 2 N-sodium carbonate solution in a manner such that the pH value can be kept constant between 6 and 7. The clear solution is saturated with sodium chloride and kept overnight at 0° C. The leuco dyestuff of the formula

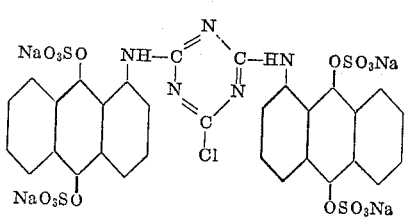

settles out in colorless flakes; it is filtered off and dried in vacuum at 70° C.

The new dyestuff dyes cotton and regenerated cellulose by the method described under A (Thermofixation Method) reddish yellow tints having very good fastness properties.

EXAMPLE 7

5 parts of 1-amino-anthraquinone are condensed with 17 parts of the condensation product (obtained, for example, as described in Example 1) from 1-amino-anthraquinone disulfuric acid leuco ester and cyanuric chloride in the presence of 12 parts of borax in 400 parts by volume of aqueous dioxane of 80% strength for 70 hours at 50 to 55° C. The reaction mixture is diluted with water, any undissolved matter is filtered off, and the solution is evaporated to dryness in a thin-layer evaporator at about 30 to 40° C.

The resulting dyestuff dyes cotton, for example in the presence of a reducing agent, fast yellow shades.

EXAMPLE 8

5.2 parts of 1-amino-4-methoxy-anthraquinone are condensed with 17 parts of the condensation product (obtained, for example, as described in Example 1) from 1-amino-anthraquinone disulfuric acid leuco ester and cyanuric chloride in the presence of 16 parts of borax in 600 parts by volume of aqueous dioxane of 80% strength for about 70 hours at 70 to 80° C. and then worked up as described in Example 7.

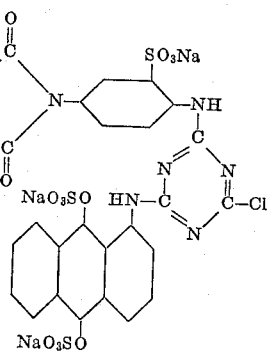

This dyestuff dyes cotton and regenerated cellulose reddish yellow tints.

Dyestuffs having similar properties are obtained by the methods described in Examples 7 and 8 by condensing 2.4 parts of 1:5-diamino-anthraquinone with 7 parts of the condensation product (obtained, for example, as described in Example 1) from 1-amino-anthraquinone disulfuric acid leuco ester and with cyanuric chloride in the presence of 8 parts of borax and 400 parts by volume of dioxane, or by condensing 2.9 parts of 1-amino-5:8-dichloroanthraquinone with 8.5 parts of the condensation product (obtained, for example, as described in Example 1) from 1-amino-anthraquinone disulfuric acid leuco ester and cyanuric chloride in the presence of 8 parts of borax and 400 parts by volume of dioxane.

EXAMPLE 9

6 parts of the product from 1-amino-4-methoxy-anthraquinone and cyanuric chloride condensed in nitrobenzene in the molecular ratio of 1:1 are condensed with 5.7 parts of 1-amino-anthraquinone disulfuric acid leuco ester and 9 parts of borax in 500 parts by volume of dioxane and 50 parts of water for 70 hours at 50 to 55° C. Working up follows the procedure described in Example 7. The resulting dyestuff produces yellow dyeings.

EXAMPLE 10

5.5 parts of the dicondensation product, produced in nitrobenzene, from 1 molecular proportion of 1:4-di-amino-leuco-anthraquinone and 2 molecular proportions of cyanuric chloride are condensed with 12 parts of 1-amino-anthraquinone disulfuric acid leuco ester in the presence of 16 parts of borax in 400 parts by volume of aqueous dioxane of 80% strength for 70 hours at 70° C. Working up follows the pattern described in Example 7.

EXAMPLE 11

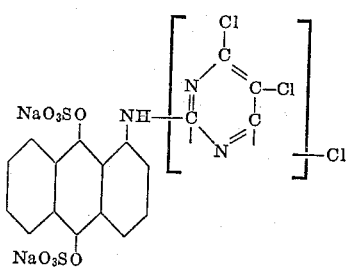

A solution of 7.7 parts of 1-amino-anthraquinone disulfuric acid leuco ester in 400 parts of water is prepared at 50° C. and then mixed with a solution of 5.2 parts of tetrachloropyrimidine in 200 parts by volume of dioxane. 20 parts by volume of N-sodium hydroxide solution are slowly added at 50° C. and a pH value of 5 to 6, the mixture is then cooled to 0 to 4° C., the dioxane is distilled off in the cold under 10 mm. Hg pressure, and the dyestuff so formed is salted out with sodium chloride. The whole is kept overnight, and the dyestuff is filtered off and dried at about 40° C.

The new dyestuff produces by the dyeing method A (Thermofixation Method) and by the dyeing method B (Pad-Steaming Method) fast yellow dyeings on regenerated cellulose.

EXAMPLE 12

A solution of 11.5 parts of 1-(2':4'-dichlorotriazinyl)-amino-anthraquinone disulfuric acid leuco ester in 100 parts of water is adjusted to pH=7 with sodium carbonate solution. A solution of 6.0 parts of the sodium salt of 1-aminobenzene-4-sulfonic acid-N-(β-sulfatoethyl)-amide in 200 parts of water is adjusted with sodium hydroxide to pH=7 and added to the aforementioned leuco-anthraquinone triazine solution. The temperature is slowly raised to 40° C. and maintained at this level until 20 parts by volume of N-sodium hydroxide solution have been consumed. The mixture is then cooled and the dyestuff salted out with sodium chloride; it precipitates only very slowly. The mother liquor must be concentrated several times. The dyestuff thus formed is filtered off; it corresponds to the formula

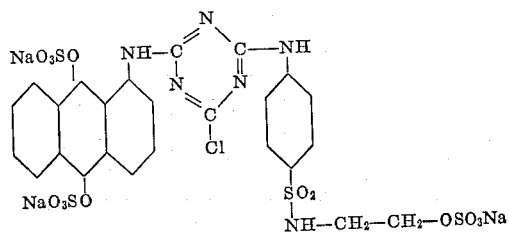

and produces on cotton by the thermofixation and pad-steaming methods fast yellow dyeings.

EXAMPLE 13

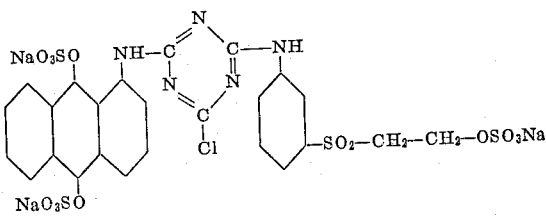

A solution of 11.5 parts of 1-(2':4'-dichlorotriazinyl-amino)-anthraquinone sulfuric acid leuco ester in 100 parts of water is adjusted at 0 to 3° C. to pH=7. A solution of 5.7 parts of the sodium salt of 1-aminobenzene-3-sulfonic acid-N-(β-sulfatoethyl)-amide in 150 parts of water, adjusted with sodium hydroxide to pH=7, is then added. The temperature is slowly raised to 40° C. and at the same time the pH value is maintained between 5 and 7 by gradually adding 20 parts by volume of N-sodium hydroxide solution. Towards the end the condensation proceeds slowly. After having salted out and kept the batch for several days in ice, only little dyestuff settles out at first. By concentration of the mother liquor further amounts of dyestuff can be obtained.

EXAMPLE 14

A solution of 5.5 parts of the disodium salt of para-aminobenzoyl-α-aminoanthraquinone sulfuric acid leuco ester of the formula

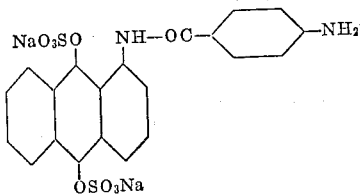

in 200 parts of water is cooled to 0° C. The solution is then acylated with a solution of 1.3 parts of chloropropionylchloride in 5 parts of toluene at 0 to 4° C. with intensive stirring, while continuously neutralizing the liberated mineral acid at a pH value of 5 to 7 with N-sodium hydroxide solution. To complete the acylation a solution of another 1.3 parts of chloropropionylchloride in 5 parts of toluene is then added and the pH value is adjusted to 8.5 when acid is no longer being liberated. The yellow dyestuff of the formula

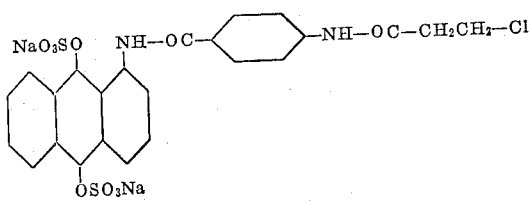

is salted out of its solution with sodium chloride, filtered off and dried in vacuum at 50° C.

The new dyestuff dyes cotton and regenerated cellulose by the method described below under (A) yellow tints having very good wet fastness.

When in this example the chloropropionylchloride is replaced by an equal amount of chloroacetylchloride, or acrylic acid chloride or chloracrylic acid chloride, dyestuffs are obtained which have similar properties.

EXAMPLE 15

20 parts of ice are stirred into a solution of 1.9 parts of cyanuric chloride in 15 parts of acetone, and the resulting suspension is added to a solution, cooled to 0° C., of 5.5 parts of the disodium salt of 1-amino-5-benzoyl-amino-anthraquinone sulfuric acid leuco ester in 100 parts of water; at the same time, at 0 to 4° C., the liberated mineral acid is continuously neutralized at a pH value of 5 to 7 with a total of about 5.5 parts of 2 N-sodium hydroxide solution. On completion of the condensation the whole is stirred for ½ hour, and the solution is then saturated with sodium chloride. The dyestuff of the formula

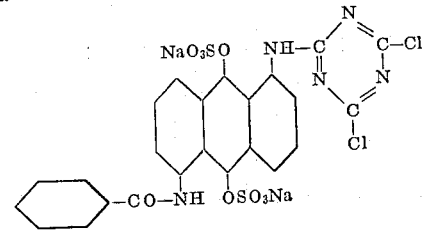

is filtered off, rinsed on the filter with a buffer solution containing 5 parts of disodium phosphate, 3 parts of monopotassium phosphate and 30 parts of sodium chloride in 200 parts of water, vigorously expressed and then dried in vacuum at 30 to 40° C.

The new dyestuff dyes cotton and regenerated cellulose by the method described in Example 1 yellow shades having very good properties of fastness.

EXAMPLE 16

The mono-condensation product obtained from 5.5 parts of 1-amino-5-benzoylaminoanthraquinone sulfuric acid leuco ester and 1.9 parts of cyanuric chloride in 100 parts of water cooled to 0° C., is mixed with 1.5 parts of monoethanolamine and the whole is stirred for 1 hour at 30° C. The new dyestuff of the formula

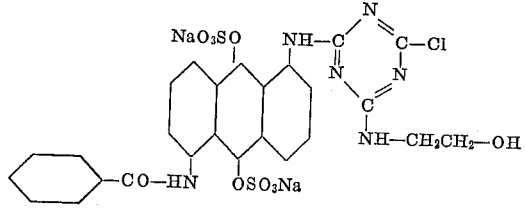

is salted out with sodium chloride, filtered off and dried in vacuum at 50° C.

The new dyestuff dyes cotton and regenerated cellulose redish yellow tints having very good properties of fastness.

When in this example the 1.5 parts of monoethanolamine are replaced by an equivalent amount of N-methylethanolamine, n-butanolamine, dimethylamine or diethylamine, dyestuffs are obtained which have similar properties.

EXAMPLE 17

A solution of 5.5 parts of the disodium salt of 1-amino-5-benzoylaminoanthraquinone sulfuric acid leuco ester in 100 parts of water is treated at 40° C. with 3.45 parts of the sodium salt of 2:4-dichloro-6-phenylamino-1:3:5-triazine-3'-sulfonic acid. The mineral acid liberated in the condensation is neutralized by the gradual addition of 5.5 parts of 2 N-sodium carbonate solution at a rate such that the pH value of the reaction solution can be kept constant at 5.5 to 7.0. The dyestuff is salted out of the solution with sodium chloride, filtered off and dried in vacuum at 60° C.

The new dyestuff corresponds to the formula

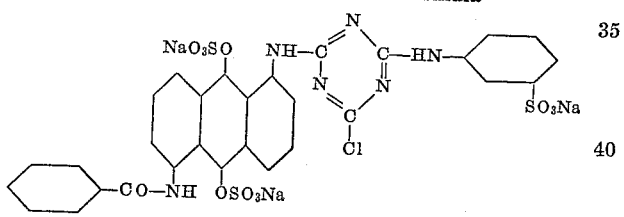

and dyes cotton and regenerated cellulose yellow tints having very good fastness properties.

When the dyestuff synthesis according to this example is carried out, instead of with 2:4-dichloro-6-phenylamino-1:3:5-triazine-3'-sulfonic acid, with 2:4-dichloro-6-phenylamino - 1:3:5 - triazine 4' - sulfonic acid or with 2:4-dichloro - 6 - phenylamino - 1:3:5 - triazine - 4' - carboxylic acid or with an equivalent amount of 2:4-dichloro-6-phenyltriazine or of 2:4-dichloro-methoxy-triazine or of 2:4-dichloro-phenylmercaptotriazine or of 2:4-dichloro-6-phenoxy-3'-sulfonic acid, there are obtained dyestuffs which have similar properties.

EXAMPLE 18

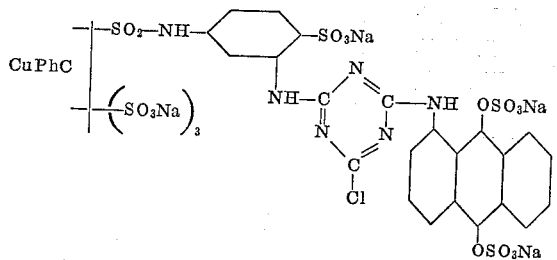

(CuPhC=radical of copper phthalocyanine)

0.01 molecular proportion of the compound of the formula

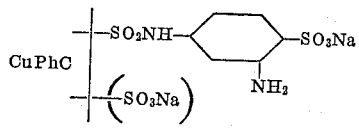

is dissolved in 200 cc. of warm water and then cooled to 10° C. A fine suspension of 1.9 grams of cyanuric chloride in 20 cc. of ice water is then added and the batch is condensed at 8 to 10° C. at a pH value of 6 to 7 with suitable addition of N-sodium hydroxide solution. When 10 cc. of N-sodium hydroxide solution have been consumed, a neutral solution of 0.01 molecular proportion of 1-aminoanthraquinone sulfuric acid leuco ester in 50 parts of water is added, the temperature is gradually raised to 40° C. and condensation is continued at a pH value of 5 to 7 until acid is no longer being eliminated. The solution, which has by then turned green, is saturated with sodium chloride and the precipitated dyestuff is filtered off, thoroughly expressed, and dried in vacuum at 60° C.

The new dyestuff dyes cotton and regenerated cellulose by the method described below under (A) bluish green, very fast tints.

When in this example the 1-aminoanthraquinone sulfuric acid leuco ester is replaced by an equivalent amount of 1-amino-5-benzoylaminoanthraquinone sulfuric acid leuco ester, a green dyestuff is obtained which has similar properties.

EXAMPLE 19

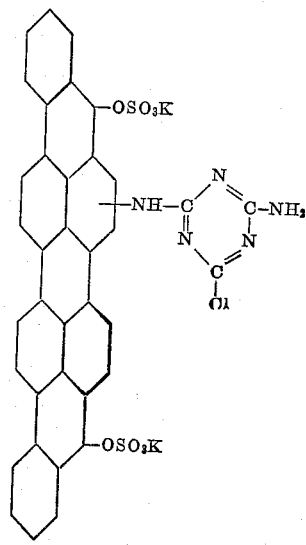

A solution of 6.8 parts of the dipotassium salt of aminodibenzanthrone sulfuric acid leuco ester in 300 parts of water is cooled to 0° C., mixed with a suspension of 1.9 parts of cyanuric chloride in 20 parts of ice water and the mixture is condensed at 5 to 10° C. and a pH value of 4 to 7 with suitable addition of N-sodium hydroxide solution. When 10 parts of N-sodium hydroxide solution have been consumed, 16 parts of 2N-ammonium hydroxide solution are added and the mixture is stirred on for 2 hours at 40° C., whereupon the dyestuff is salted out and filtered off.

The new dyestuff dyes cotton and regenerated cellulose navy blue shades.

The amino-dibenzanthrone sulfuric acid leuco ester is prepared in the following manner:

A solution of 7.5 parts of methylamine in 250 parts of dimethylformamide is mixed at room temperature with 3 parts of sodium β-naphthalene sulfonate, 48.6 parts of aminodibenzanthrone and 33 parts of zinc dust, and the mixture is stirred for 45 minutes at 20 to 30° C. In the course of 45 minutes, at 0 to 8° C., the adduct of 48 parts of sulfur trioxide with 100 parts of dimethylformamide is then added, the mixture is stirred for ½ hour at 0 to 8° C., and the reaction product is stirred into a mixture of 66 parts of sodium carbonate and 1500 parts of water. The precipitated zinc compounds are filtered off, and the sulfuric acid ester is salted out from the filtrate with potassium chloride and potassium carbonate. The brown ester salt is filtered off and further worked up in the form of the moist filter cake.

EXAMPLE 20

A solution of 190 parts (1.03 mols) of cyanuric chloride in 600 parts by volume of acetone is stirred into 1200 parts of ice. 464 parts (1 mol) of the sodium salt of the sulfuric acid leuco ester of 6-chloro-1-aminoanthraquinone are then vigorously stirred in at a maximum temperature of 5° C.; at the same time a solution of 40 parts of sodium hydroxide in 120 parts of water is added at a rate such that the reaction solution displays a pH value of 3 to 5. After about 20 minutes the reaction is complete. The pH value is adjusted to 8.5, and the reaction mixture is evaporated to dryness in vacuum.

salt of the sulfuric acid leuco ester of 1-amino-4-benzoyl-aminoanthraquinone are then added, the temperature is raised to 30 to 40° C., and the pH value is maintained at 5 to 6 by dropping in a sodium carbonate solution of 10% strength. Stirring for about 2 hours at 30 to 40° C. completes the reaction. The acetone is distilled out of the reaction mixture in vacuum, and the reaction product is salted out and dried.

The resulting sulfuric acid leuco ester salt is a yellow powder which is readily soluble in water; it dyes cotton very fast orange shades.

When the sulfuric acid leuco ester salts are used in the reverse order of succession, the identical dyestuffs results.

The examples mentioned in the following table can be carried out as described in Example 22:

| No. | Sulfuric acid leuco ester salt, corresp. to Formula III | Triazine derivative | Sulfuric acid leuco ester salt, corresp. to Formula IV | Tint on cotton |
|---|---|---|---|---|
| 1 | 1-aminoanthraquinone | 2:4:6-trichloro-1:3:5-triazine | 1-amino-5-benzoylaminoanthraquinone | Yellow. |
| 2 | 1-amino-5-benzoylaminoanthraquinone | do | do | Do. |
| 3 | 1-amino-5-chloroanthraquinone | do | do | Do. |
| 4 | 1-amino-6-chloroanthraquinone | do | do | Do. |

The resulting sulfuric acid leuco ester salt is a readily water-soluble yellow powder which produces on cotton greenish yellow dyeings or prints having very good properties of fastness.

EXAMPLE 21

A solution of 46.3 parts (0.1 mol) of the sodium salt of the sulfuric acid leuco ester of 1-amino-5-chloranthraquinone in 250 parts of water is treated at 30–40° C. dropwise, while being stirred, with a solution of 22 parts (0.1 mol) of 2-butoxy-4:6-dichlorotriazine-(1:3:5) in 150 parts of dioxane. At the same time aqueous sodium hydroxide solution of 10% strength is added to maintain the pH value at 4 to 5. After stirring for 7 hours at 30 to 40° C., the reaction is complete. The reaction product is salted out with potassium chloride, filtered off and dried.

The resulting sulfuric acid leuco ester salt is a readily water-soluble yellow powder which dyes cotton greenish yellow tints having good properties of fastness.

By the methods described in Examples 20 and 21 further dyestuffs can be prepared which yield the tints shown in the following table:

EXAMPLE 23

A solution of 18 parts (0.1 mol) of 2:5-dichloro-6-methoxytriazine in 50 parts of acetone is stirred into 200 parts of ice, the resulting suspension is mixed, with stirring at 30 to 40° C., with 46 parts (0.1 mol) of the sodium salt of the sulfuric acid leuco ester of 1-amino-5-chloroanthraquinone, while maintaining the pH value at 5 to 6 by dropping in a sodium carbonate solution of 10% strength. Stirring for 30 minutes at 30 to 40° C. completes the reaction, and the reaction product is isolated in usual manner.

The resulting sulfuric acid leuco ester salt is a yellow powder which is readily soluble in water and dyes cotton very fast yellow tints.

When the 18 parts of 2:4-dichloro-6-methoxytriazine are replaced by 22 parts of 2:4-dichloro-6-diethylamino-triazine, a dyestuff is obtained which produces similar yellow dyeings.

EXAMPLE 24

A solution of 38 parts (0.2 mol) of cyanuric chloride in 150 parts of acetone is stirred into 400 parts of ice,

| No. | Sulfuric acid leuco ester salt, corresponding to the Formula III | Triazine derivative, corresponding to the Formula II | Tint on cotton |
|---|---|---|---|
| 1 | 1-amino-anthraquinone | 2-amino-4:6-dichlorotriazine | Yellow. |
| 2 | do | 2-ethylamino-4:6-dichlorotriazine | Do. |
| 3 | do | 2-cyclohexylamino-4:6-dichlorotriazine | Do. |
| 4 | do | 2-morpholino-4:6-dichlorotriazine | Do. |
| 5 | do | 2-anilino-4:6-dichlorotriazine | Do. |
| 6 | do | 2-(4'-nitranilino)-4:6-dichlorotriazine | Do. |
| 7 | do | 2-phenoxy-4:6-dichlorotriazine | Do. |
| 8 | do | 2-methoxy-4:6-dichlorotriazine | Do. |
| 9 | do | 2-phenyl-4:6-dichlorotriazine | Do. |
| 10 | 1-amino-6-chloroanthraquinone | 2-butoxy-4:6-dichlorotriazine | Do. |
| 11 | 1-amino-7-chloroanthraquinone | do | Do. |
| 12 | 1-amino-8-chloroanthraquinone | 2-methoxy-4:6-dichlorotriazine | Red. |
| 13 | 1-amino-4-benzoylaminoanthraquinone | 2:4:6-trichlorotriazine | Yellow. |
| 14 | 1-amino-5-benzoylaminoanthraquinone | do | Do. |
| 15 | 1-amino-8-benzoylaminoanthraquinone | do | Do. |
| 16 | do | 2-methoxy-4:6-dichlorotriazine | Do. |

EXAMPLE 22

A solution of 56 parts (0.3 mol) of cyanuric chloride in 200 parts of acetone is stirred into 600 parts of ice, and 160 parts (0.3 mol) of the sodium salts of the sulfuric acid leuco ester of 1-amino-5-benzoylaminoanthraquinone are stirred at 0 to 5° C. into the resulting suspension, while maintaining the pH value of the batch at 5 to 6 by dropping in a sodium carbonate solution of 10% strength. Stirring for about 20 minutes at 0 to 5° C. completes the reaction. 160 parts (0.3 mol) of the sodium and 86 parts (0.2 mol) of the sodium salt of the sulfuric acid leuco ester of 1-aminoanthraquinone are stirred at 0 to 5° C. into the resulting suspension, while maintaining the pH value at 5 to 6 by dropping in a sodium carbonate solution of 10% strength. Stirring for about 20 minutes at 5° C. completes the reaction. The reaction mixture is then treated with 18 parts (0.097 mol) of benzidine and stirred while raising the temperature to 30 to 40° C. The pH value is allowed to drop to about 3 and then maintained at 3 to 4 by dropping in more sodium carbonate solution of 10% strength. Stirring for about 2 hours completes the reaction, whereupon the pH value is adjusted to 8.5 and the acetone is removed by distillation under reduced pressure. The reaction product is then salted out.

The resulting sulfuric acid leuco ester salt is a yellow powder which is readily soluble in water and dye textile fibers fast yellow tints.

When 0.2 mol of 2:4:6-trichlorotriazine are used in the process of Example 24, the dyestuffs and tints shown in the following table can be produced:

into this suspension at 0 to 5° C., while maintaining the pH value at 3 to 4 by dropping in a sodium carbonate solution of 10% strength. Stirring for about 2 hours at 0 to 5° C. completes the reaction, whereupon the reaction product formed is filtered off and dried.

The resulting sulfuric acid leuco ester salt is a yellow powder which is readily soluble in water and dyes textile materials handsome, very fast yellow tints.

A sulfuric acid leuco ester salt which produces similar yellow dyeings is obtained by replacing in this example

| No. | Sulfuric acid leuco ester salt (0.2 mol), corresp. to Formula VI | Diamine (0.1 mol) | Tint on cotton |
|---|---|---|---|
| 1 | 1-aminoanthraquinone | Hydrazine | Yellow. |
| 2 | ----do---- | Ethylenediamine | Do. |
| 3 | ----do---- | 2:2'-tolidine | Do. |
| 4 | ----do---- | 2:2'-dianisidine | Do. |
| 5 | ----do---- | 4:4'-diaminostilbene | Do. |
| 6 | ----do---- | 4:4'-diaminodiphenylurea | Do. |
| 7 | ----do---- | 4:4'-diaminodiphenylsulfone | Do. |
| 8 | ----do---- | 4:4'-diaminodiphenylsulfone | Do. |
| 9 | 1-amino-4-chloroanthraquinone | Benzidine | Do. |
| 10 | 1-amino-5-chloroanthraquinone | 2:2'-dianisidine | Do. |
| 11 | ----do---- | 4:4'-diaminodiphenylamine | Do. |
| 12 | Mixture of 1-amino-6- and -7-chloroanthraquinone. | Benzidine | Do. |
| 13 | 1-amino-8-chloroanthraquinone | ----do---- | Do. |
| 14 | 1-amino-4-benzoylaminoanthraquinone | 1:3-diaminobenzene | Do. |
| 15 | ----do---- | 1:4-diaminobenzene | Red. |
| 16 | ----do---- | 2:2'-dichlorobenzidine | Do. |
| 17 | ----do---- | 1-amino-4-(4'-aminobenzoyl)-aminobenzene. | Do. |
| 18 | 1-amino-5-benzoylaminoanthraquinone | Benzidine | Yellow. |
| 19 | 1-amino-8-benzoylaminoanthraquinone | ----do---- | Do. |
| 20 | 1-amino-5-chloroanthraquinone | Sulfuric acid leuco ester salt of 1:5-diaminoanthraquinone. | Do. |

EXAMPLE 25

A solution of 38 parts (0.2 mol) of cyanuric chloride in 150 parts of acetone is stirred into 400 parts of ice, and 86 parts (0.2 mol) of the sodium salt of the sulfuric acid leuco ester of 1-aminoanthraquinone are stirred at 0 to 5° C. into the resulting suspension, while maintaining the pH value at 3 to 5 by dropping in a sodium carbonate solution of 10% strength. Stirring for about 20 minutes completes the reaction. 44.4 parts (0.1 mol) of the sodium salt of the sulfuric acid leuco ester of 1:5-diaminoanthraquinone are then stirred in and the temperature is raised to 30 to 40° C. while stirring. The pH value is kept within the limits specified above by adding further sodium carbonate solution of 10% strength. After about 2 to 3 hours the reaction is complete. The dyestuff formed is salted out, filtered off and dried.

The resulting sulfuric acid leuco ester salt is a yellow powder which is readily soluble in water and dyes textile materials very fast yellow tints. The identical dyestuff is obtained by reacting 0.2 mol of cyanuric chloride with 0.1 mol of the sodium salt of the sulfuric acid leuco ester salt of 1:5-diaminoanthraquinone and reacting the resulting compound with 0.2 mol of the sodium salt of the sulfuric acid leuco ester of 1-aminoanthraquinone.

EXAMPLE 26

A solution of 38 parts (0.2 mol) of cyanuric chloride in 150 parts of acetone is stirred into 400 parts of ice, and 44 parts (0.1 mol) of the sodium salt of the sulfuric acid leuco ester of 1:5-diaminoanthraquinone are stirred the sulfuric acid leuco ester salt of 1:5-diaminoanthraquinone by the sulfuric acid leuco ester salt of 1:8-diaminoanthraquinone.

EXAMPLE 27

A solution of 74 parts of the sulfuric acid leuco ester salt obtained as described in Example 26 in 600 parts of water is mixed with 19 parts (0.2 mol) of aniline, and the mixture is stirred for 6 hours at 30 to 40° C., while maintaining the pH value of the reaction solution at 5 to 6 by dropping in a sodium carbonate solution of 10% strength.

On completion of the reaction the dyestuff formed is salted out with potassium chloride, filtered off and dried.

The resulting sulfuric acid leuco ester salt is a yellow powder which is readily soluble in water and dyes cotton fast yellow tints which are slightly more reddish than those obtained as described in Example 26.g

EXAMPLE 28

36 parts (0.2 mol) of 2:4-dichloro-6-methoxy-triazine are reacted as described in Example 26 with 44 parts (0.1 mol) of the sodium salt of the sulfuric acid leuco ester salt of 1:5-diaminoanthraquinone at 30 to 40° C. After about 30 minutes the reaction is complete, whereupon the dyestiff formed is filtered off and dried.

The resulting sulfuric acid leuco ester salt is a yellow powder which is readily soluble in water and dyes cotton very fast yellow shades.

The examples listed in the following table can be performed as described in the foregoing Examples 26 to 28:

| No. | Sulfuric acid leuco ester salt (0.1 mol) | Triazine derivative (0.2 mol) | Tint on cotton |
|---|---|---|---|
| 1 | 1:4-diaminoanthraquinone | 2:4-dichloro-6-hexylaminotriazine | Red. |
| 2 | ----do---- | 2:4-dichloro-6-phenoxytriazine | Red. |
| 3 | ----do---- | 2:4-dichloro-6-butoxytriazine | Red. |
| 4 | 1:5-diaminoanthraquinone | 2:4-dichloro-6-aminotriazine | Yellow. |
| 5 | ----do---- | 2:4-dichloro-6-ethylaminotriazine | Do. |
| 6 | ----do---- | 2:4-dichloro-6-cyclohexylaminotriazine | Do. |
| 7 | ----do---- | 2:4-dichloro-6-ethylbutoxytriazine | Do. |
| 8 | 1:8-diaminoanthraquinone | 2:4-dichloro-6-isopropylaminotriazine | Do. |
| 9 | ----do---- | 2:4-dichloro-6-phenyltriazine | Do. |

To illustrate the numerous, different ways in which the sulfuric acid leuco esters of the invention can be applied, the following examples of dyeing and printing methods are described:

(A) *Thermofixation method*

2 parts of the dyestuff prepared as described in the first paragraph of Example 16 together with 2 parts of anhydrous sodium carbonate and 20 parts of urea are dissolved in 100 parts of water and this solution is used to impregnate a cotton fabric to a weight increase of 75%. The fabric is then dried and treated for 5 minutes in a current of dry air at 140° C., then treated for 15 minutes at 40 to 50° in an oxidizing bath containing per liter 10 grams of sodium nitrite and 50 cc. of sulfuric acid of 10% strength, rinsed, neutralized in an aqueous sodium carbonate solution of 0.5% strength, rinsed, soaped for 15 minutes in a boiling solution of 0.2% strength of a non-ionic detergent, rinsed and dried. A yellow dyeing is obtained.

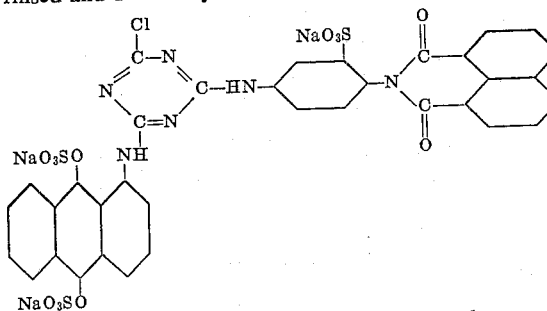

(B) *Reductive pad-steaming method*

A cotton fabric is impregnated with a solution of 2 parts of dyestuff in 100 parts of water, squeezed to a weight increase of 75% and dried. The fabric is then further impregnated in a solution of 250 parts of sodium chloride, 50 parts of anhydrous sodium sulfite and 10 parts of caustic soda in 1000 parts of water, squeezed to a weight increase of 75%, steamed for 60 seconds at 100° C., then treated in an oxidizing bath containing per liter 10 grams of sodium nitrite and 50 cc. of sulfuric acid of 10% strength for 15 minutes at 40 to 50° C., rinsed, neutralized in an aqueous sodium carbonate solution of 0.5% strength, rinsed, soaped for 15 minutes in a boiling solution of 0.2% strength of a non-ionic detergent, rinsed and dried. Instead of being added to the second impregnating liquor, the reducing agent may be added to the dyestuff solution.

(C) *Single-bath steaming method*

4 parts of the dyestuff of the formula

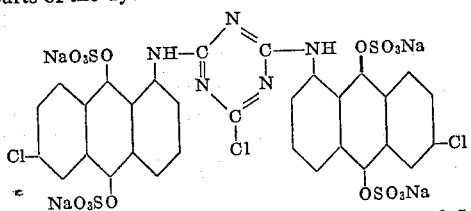

together with 2 parts of sodium bicarbonate and 5 parts of urea are dissolved in 100 parts of water. A viscous spun rayon fabric is impregnated with this solution, dried, steamed for 3 minutes at 100° C., then treated for 15 minutes at 40 to 50° C. in an oxidizing bath containing per liter 10 grams of sodium nitrite and 50 cc. of sulfuric acid of 10% strength, rinsed, neutralized in a sodium carbonate solution of 0.5% strength, rinsed, soaped for 15 minutes in a boiling solution of 0.2% strength of a non-ionic detergent, rinsed and dried. A greenish yellow dyeing is obtained.

(D) *Cold-storage method*

2 parts of the dyestuff obtained as described in Example 6 together with 1 part of anhydrous sodium sulfate and 1 part of caustic soda are dissolved in 100 parts of water. A cotton fabric is impregnated with this solution to a weight increase of 75%, reeled on a mandrel and the whole is wrapped in an airtight sheet of plastic and kept for 24 hours at 30° C. The fabric is then treated for 15 minutes at 40 to 50° C. in an oxidizing bath containing per liter 10 grams of sodium nitrite and 50 cc. of sulfuric acid of 10% strength, rinsed, neutralized in an aqueous sodium carbonate solution of 0.5% strength, rinsed, soaped for 15 minutes in a boiling solution of 0.2% strength of a non-ionic detergent, rinsed and dried. A distinctly greenish yellow dyeing is obtained. A distinctly stronger dyeing is obtained by adding to the above padding liquor 10 parts of anhydrous sodium sulfate and 5 parts of a reducing agent such, for example, as anhydrousسodium sulfide.

(E) *Pressure steaming method*

A solution of 2 parts of the dyestuff of the formula

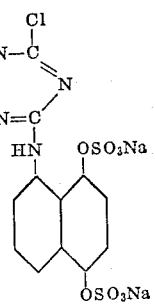

in 39 parts of water and 15 parts of urea is stirred into 40 parts of a sodium alginate thickening of 5% strength. There are then further added 3 parts of an aqueous solution of 50% strength of anhydrous potassium carbonate, 0.1 part of 10 N-sodium hydroxide solution and 1 part of an oxidant such, for example, as sodium meta-nitrobenzenesulfonate.

A cotton fabric is printed with this printing paste, dried, steamed for 8 minutes at 100° C., then treated for 15 minutes at 40 to 50° C. in an oxidizing bath containing per liter 10 grams of sodium nitrite and 50 cc. of sulfuric acid of 10% strength, rinsed, neutralized in an aqueous sodium carbonate solution, rinsed, soaped for 15 minutes in a boiling solution of 0.2% strength of a non-ionic detergent, rinsed and dried. A red print is obtained.

Instead of using 3 parts of an aqueous solution of 50% strength of anhydrous potassium carbonate and 0.1 part of 10 N-sodium hydroxide solution there may be used with equal success 3 parts of sodium bicarbonate.

(F) *Single-bath steaming method without intermediate drying*

2 parts of the dyestuff referred to under (E) above, together with 5 parts of anhydrous sodium sulfide and 1.5 parts of 10 N-sodium hydroxide solution, are dissolved in 100 parts of water. A cotton fabric is impregnated with this solution, squeezed to a weight increase of 75%, and, *without first having been dried*, steamed for 60 seconds at 100° C., then treated for 15 minutes at 40 to 50° C. in an oxidizing bath containing per liter 10 grams of sodium nitrite and 50 cc. of sulfuric acid of 10% strength, rinsed, neutralized in an aqueous sodium carbonate solution of 0.5% strength, soaped for 15 minutes in a boiling solution of 0.2% strength of a non-ionic detergent, rinsed and dried. A red dyeing is obtained.

(G) *Exhaustion method using a reducing agent*

A solution of 6 parts of the dyestuff according to Example 2 in 300 parts of water is introduced into 3000 parts of water and 30 parts of 10 N-sodium hydroxide solution and 12 parts of sodium hydrosulfite added. 100 parts of a cotton fabric are immersed in this dyebath at 60° C. After 10 minutes 300 parts of an aqueous sodium chloride solution of 20% strength are added and the temperature is raised within 5 minutes to 70° C. 5 minutes later another 300 parts of an aqueous sodium chloride solution of 20% strength are added and the temperature is raised within 10 minutes to 80° C. The fabric is dyed for 15 minutes at 80° C. and then rinsed, treated for 15 minutes at 40 to 50° C. in an oxidizing bath containing per liter 10 grams of sodium nitrite and 50 cc. of sulfuric acid of 10% strength, rinsed, neutralized in an aqueous sodium carbonate solution of 0.5% strength, rinsed, soaped for 15 minutes in a boiling solution of 0.2% strength of a non-ionic detergent, rinsed and dried. A yellowish red dyeing is obtained. An equally satisfactory dyeing is obtained when the fabric is dyed for 45 minutes at 50° C.

*(H) Infra-red fixation method*

2 parts of the dyestuff of the formula

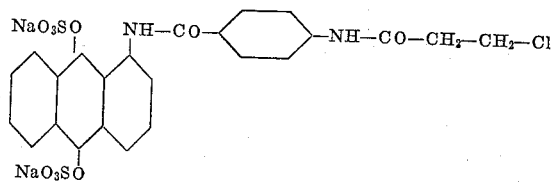

together with 2 parts of anhydrous sodium carbonate and 10 parts of urea, are dissolved in 100 parts of water. A cotton fabric is impregnated with this solution, squeezed to a weight increase of 75% and, *without first having been dried*, exposed for 40 to 50 seconds in an infra-red field at 150° C. (the temperature in the fixing zone, measured by means of a thermoelement, being adjusted by varying the burner distance). The fabric is then treated for 15 minutes at 40 to 50° C. in an oxidizing bath containing per liter 10 grams of sodium nitrite and 50 cc. of sulfuric acid of 10% strength, rinsed, neutralized in an aqueous sodium carbonate solution of 0.5% strength, rinsed, soaped for 15 minutes in a boiling solution of 0.2% strength for a non-ionic detergent, rinsed and dried. A yellow dyeing is obtained.

*(I) Exhaustion method without using a reducing agent*

30 parts of the dyestuff referred to above under (E) are dissolved in 1200 parts of water containing 400 parts of an aqueous sodium chloride solution of 25% strength. 100 parts of a cotton fabric are immersed in this dyebath at 60° C. After 15 minutes another 400 parts of an aqueous sodium chloride solution of 25% strength are added and dyeing is continued for 45 minutes at 60° C. The fabric is then treated for 15 minutes at 40 to 50° C. in an oxidizing bath containing per liter 10 grams of sodium nitrite and 50 cc. of sulfuric acid of 10% strength, rinsed, neutralized in an aqueous sodium carbonate solution of 0.5% strength, rinsed and soaped for 15 minutes in a boiling solution of 0.2% strength of a non-ionic detergent, rinsed and dried. A red dyeing is obtained.

*(J) Printing method with infra-red treatment*

2 parts of the dyestuff referred to above under (E) are dissolved in 39 parts of water and 15 parts of urea and this solution is stirred into 40 parts of sodium alginate thickening of 5% strength. There are then added 3 parts of an aqueous solution of 50% strength of anhydrous potassium carbonate, 0.1 part of 10 N-sodium hydroxide solution and 1 part of an oxidant such, for example, as sodium meta-nitrobenzenesulfonate.

A cotton fabric is printed with this printing paste and, without intermediate drying, exposed for 60 seconds between two infra-red radiators in the center of the infra-red field while the temperature is adjusted to 150° C. (measured by means of a thermoelement) by suitably setting the distance between the two radiators. The fabric is then treated for 15 minutes at 40 to 50° C. in an oxidizing bath containing per liter 10 grams of sodium nitrite and 50 cc. of sulfuric acid of 10% strength, rinsed, neutralized in an aqueous sodium carbonate solution of 0.5% strength, rinsed, soaped for 15 minutes in a boiling solution of 0.2% strength of a non-ionic detergent, rinsed and dried.

Other new but non-reactive dyes are also the water-soluble salts of sulfuric acid esters of leuco vat dyestuffs of the anthraquinone series, the free acids of which correspond to the following general formula:

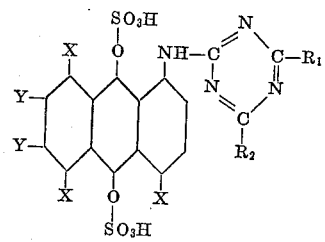

wherein each X means hydrogen or a chlorine atom or a —NH-aroyl radical, each Y means hydrogen or a chlorine atom, $R_1$ means a —$NH_2$, —NH-alkyl, —N(alkyl)$_2$, —NH—cyclohexyl, —NH-aryl, —O-alkyl, —O-aryl, piperidine or morpholine radical and $R_2$ means a —$NH_2$, NH-alkyl, —N(Alkyl)$_2$, —NH-cyclohexyl, —NH-aryl, —O-alkyl, —O-aryl, phenyl, piperidine or morpholine radical, both the radicals X and Y being the same or different radicals, with the condition that at least 6 hydrogen atoms are attached directly at the carbon atoms of the anthracene nucleus, "alkyl" means always lower alkyl radicals containing 1 to 6 carbon atoms.

These new, water-soluble salts of sulfuric acid esters of leuco vat dyestuffs of the above general Formula I are prepared by reacting, in an aqueous medium and in the presence of a mineral acid binding agent, 1 mol of a compound of the general formula:

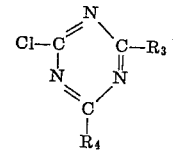

wherein $R_3$ means chlorine or a —$NH_2$, —NH-alkyl, —N(alkyl)$_2$, —NH-cyclohexyl, —NH-aryl, —O-alkyl, —O-aryl, piperidine or morpholine radical and $R_4$ means chlorine or a —$NH_2$, —NH-alkyl, —N(alkyl)$_2$, —NH-cyclohexyl, —NH-aryl, —O-alkyl, —O-aryl, phenyl, piperidine or morpholine radical, with 1 mol of a compound corresponding, in the form of the free acid, to the following general formula:

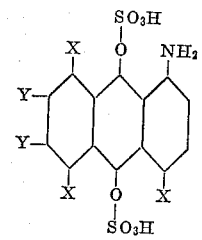

wherein each X and Y has the above meaning, at least 6 hydrogen atoms being attached directly at the carbon atoms of the anthracene nucleus, with the condition that in those cases, where the resultant reaction product of the above Formula I contain one or two chlorine atoms, the said reaction products are caused to react with compounds of the following general formula:

$$H—R_1 \qquad (IV)$$

wherein $R_1$ has the above said meaning.

The salts of sulfuric acid esters of the above Formula III are derived from the following 1-aminoanthraquinones:

1-aminoanthraquinone,
1-amino-4-, -6-, -7- and -8-chloroanthraquinone, 1-amino-4-, -5- and -8-benzoylaminoanthraquinones,
1-amino-4-, -5- and -8-(chlorobenzoylamino)-anthraquinones and
1-amino-4-, -5- and -8-(4'-phenyl-benzoylamino)-anthraquinones.

It has been found that 2:4:6-trichlorotriazine as well as its derivatives either monosubstituted by one radical $R_1$ or disubstituted by two radicals $R_1$, 2:4-dichloro-6-phenyltriazine and derivatives thereof which are monosubstituted by one radical $R_1$ are especially suitable for the preparation of our new compounds, $R_1$ having the same meaning as defined above.

The radical $R_1$ may be derived, for example, from the following amines: methyl-, ethyl-, n-propyl-, isopropyl-, n-butyl-, n-amyl-, n-hexyl-, cyclohexyl-, 1:3-dimethylbutyl-, dimethyl-, diethyl-, dibutyl-, diamyl-, dihexylamines, piperidine, morpholine, aniline, monochloranilines and nitroanilines, as well as from the following alcohols: methyl-, ethyl-, n-propyl-, isopropyl-, n-butyl-, 2-ethyl-n-butyl-, n-hexylalcohol and phenol.

In order to accelerate the reaction course it may be advantageous to partly or wholly dissolve the compounds of the last-mentioned general Formula II in an inert solvent. For this purpose, for example, the following solvents are particularly suitable: benzene, monochlorobenzene, toluene, acetone, methyl ethyl ketone and dioxane.

As mineral acid binding agents, for example, sodium hydroxide, potassium hydroxide, sodium carbonate and potassium carbonate are particularly suitable. The mineral acid binding agent is preferably added to the reaction mixture in a certain relation to the formation of hydrochloric acid so that the pH value is preferably maintained to below 7. In practice, it is advantageous to carry out the present process first at a temperature range of 0 to 5° C., then at a temperature between 30 and 40° C. and finally at a temperature range of 70 to 90° C.

Suitable water-soluble salts of sulfuric acid esters are the lithium, sodium, potassium, ammonium and triethanolamine salts.

The salts of sulfuric acid esters of leuco vat dyestuffs of the anthraquinone series of the present invention constitute yellow powders which are readily soluble in water and give on textile materials very fast shades or prints when applied according to technics usually used for this dyestuff class.

EXAMPLE 29

190 parts (1.03 mols) of cyanuric chloride are dissolved in 600 parts by volume of acetone and the solution is poured onto 1,200 parts of ice while stirring. Then, while vigorously stirring, 429 parts (1 mol) of the sodium salt of the sulfuric acid ester of leuco-1-aminoanthraquinone are added to the solution at a temperature of at most 5° C., a solution of 40 parts of sodium hydroxide in 120 parts of water being added simultaneously so that the pH value of the reaction solution is kept between 3 and 5. After about 20 minutes the reaction is complete. The pH value is adjusted to 8.5 and the reaction mixture evaporated to dryness in vacuo.

58 parts (0.1 mol) of the sulfuric acid ester salt thus obtained are dissolved in 250 parts of water. Then 50 parts of a concentrated aqueous ammonia solution are added. The reaction mixture is stirred at 30 to 40° C. for one hour and at 80 to 90° C. for a further hour and precipitated by addition of sodium chloride. The resultant precipitate is isolated and dried.

The leuco sulfuric acid ester salt is thus obtained in form of a yellow powder readily soluble in water. When dyed according to conventional methods on cotton, reddish yellow dyeings of excellent light fastness properties are obtained.

The identical dyestuff is obtained by reacting at 80 to 90° C. for 4 hours 43 parts (0.1 mol) of the sodium salt of the sulfuric acid ester of leuco-1-aminoanthraquinone with 22 parts (1.5 mols) of 2:4-diamino-6-chlorotriazine- (1:3:5).

When working in the same way as in the above example, but using the leuco sulfuric acid ester salt mentioned in the second column of the following table and the triazine derivative mentioned in the third column of the following table, the shades mentioned in the fourth column will be obtained on cotton.

TABLE

| No. | Leuco sulfuric acid ester salt according to the last-mentioned Formula III | Triazine derivative according to the last-mentioned Formula II | Shade on cotton |
|---|---|---|---|
| 2 | 1-aminoanthraquinone | 2:4-di-isopropylamino-6-chlorotriazine | Yellow. |
| 3 | ____do____ | 2:4-di-(1'-3'-dimethylbutyl-amino)-6-chlorotriazine. | Do. |
| 4 | ____do____ | 2:4-di-(n)-butylamino-6-chlorotriazine | Do. |
| 5 | ____do____ | 2:4-di-(di-(n)-butyl-amino)-6-chlorotriazine | Do. |
| 6 | ____do____ | 2:4-dicyclohexylamino-6-chlorotriazine | Do. |
| 7 | ____do____ | 2-amino-4-morpholino-6-chlorotriazine | Do. |
| 8 | ____do____ | 2:4-dianilino-6-chlorotriazine | Do. |
| 9 | ____do____ | 2:4-di-4'-chloroanilino-6-chlorotriazine | Do. |
| 10 | ____do____ | 2-methoxy-4-piperidino-6-chlorotriazine | Do. |
| 11 | ____do____ | 2-butoxy-4-anilino-6-chlorotriazine | Do. |
| 12 | ____do____ | 2-(2'-ethyl-butoxy)-4-piperidino-6-chlorotriazine | Do. |
| 13 | ____do____ | 2-phenoxy-4-piperidino-6-chlorotriazine | Do. |
| 14 | ____do____ | 2-phenyl-4-anilino-6-chlorotriazine | Do. |

| No. | Leuco sulfuric acid ester salt according to the last-mentioned Formula III | Triazine derivative according to the last-mentioned Formula II | Shade on cotton |
|---|---|---|---|
| 15 | 1-amino-4-chloroanthraquinone | 2:4-diethylamino-6-chlorotriazine | Yellow. |
| 16 | 1-amino-5-chloroanthraquinone | 2:4-dianilino-6-chlorotriazine | Do. |
| 17 | 1-amino-6-chloroanthraquinone | 2:4-dimethoxy-6-chlorotriazine | Do. |
| 18 | 1-amino-7-chloroanthraquinone | 2:4-dimethoxy-6-chlorotriazine | Do. |
| 19 | Mixture of 1-amino-6-chloro and 1-amino-7-chloroanthraquinone | 2:4-dimethoxy-6-chlorotriazine | Do. |
| 20 | 1-amino-8-chloroanthraquinone | 2-amino-4-anilino-6-chlorotriazine | Do. |
| 21 | 1-amino-4-benzoylamino-anthraquinone | 2:4-diamino-6-chlorotriazine | Red. |
| 22 | ____do____ | 2:4-dimethoxy-6-chlorotriazine | Red. |
| 23 | 1-amino-4-(4'-phenyl)-benzoylamino-anthraquinone | 2:4-dimethoxy-6-chlorotriazine | Red. |
| 24 | 1-amino-5-benzoylamino-anthraquinone | 2:4-diamino-6-chlorotriazine | Yellow. |
| 25 | ____do____ | 2:4-di-(dimethylamino)-6-chlorotriazine | Do. |
| 26 | ____do____ | 2:4-dianilino-6-chlorotriazine | Do. |
| 27 | 1-amino-8-benzoylamino-anthraquinone | 2:4-dianilino-6-chlorotriazine | Do. |

Also new and nonreactive are the water-soluble salts of sulfuric acid esters of leuco vat dyestuffs of the anthraquinone series, the free acids of which correspond to the following general formula:

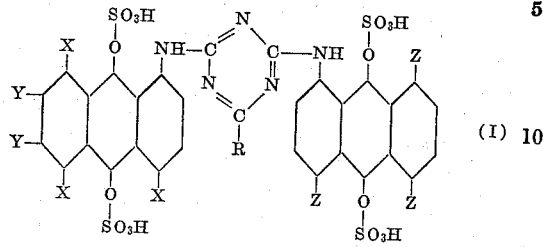

(I)

wherein each X means hydrogen or a chlorine atom or an —NH-aroyl radical, each Y means hydrogen or a chlorine atom, one of the radicals Z stands for the NH-aroyl radical, while both the remaining radicals Z mean hydrogen, the radical R means a —NH$_2$, —NH-alkyl, —N(alkyl)$_2$, —NH-cyclohexyl, —NH-aryl—, —O-alkyl, —O-aryl, phenyl, piperidine or morpholine radical, both the radicals X and Y being the same or different radicals, with the condition that at least 6 hydrogen atoms are attached directly at the carbon atoms of each anthracene nucleus, "alkyl" meaning always lower alkyl radicals containing 1 to 6 carbon atoms.

These new, water-soluble salts of sulfuric acid esters of leuco vat dyestuffs of the above Formula I (last mentioned) are prepared by reacting, in any desired order of succession and in the presence of an aqueous medium containing a mineral acid binding agent, a compound of the general formula:

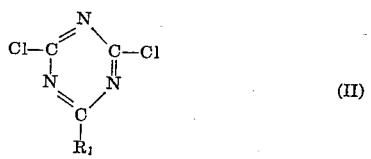

(II)

wherein R$_1$ means chlorine or an —NH$_2$, —NH-alkyl, —N(alkyl)$_2$, —NH-cyclohexyl, —NH-aryl—, —O-alkyl, —O-aryl, phenyl, piperidine or morpholine radical, with 1 mol of a compound corresponding, in the form of the free acid, to the following general formula:

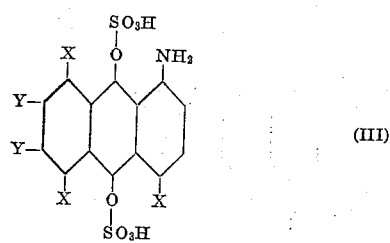

(III)

wherein each Y and X has the above meaning, at least 6 hydrogen atoms being attached directly at the carbon atoms of the anthracene nucleus, and with 1 mol of a compound corresponding, in the form of the free acid, to the following general formula:

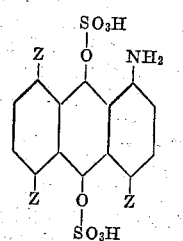

(IV)

wherein each radical Z has the above meaning with the condition that at least 6 hydrogen atoms are attached directly at the carbon atoms of the anthracene nucleus.

In those cases, where the resultant reaction products of the above Formula I (last mentioned) contain a chlorine atom in the triazine nucleus, the said reaction products are caused to react with compounds of the following general formula:

wherein R$_2$ means an —NH$_2$—, NH-alkyl-,

—N(alkyl)$_2$—, NH-cycloalkyl-, —NH-aryl-

—O-alkyl, —O-aryl, piperidine, or morpholine radical.

The salts of sulfuric acid esters of the above Formula III (last mentioned) are derived from the following 1-amino-anthraquinones: 1-aminothraquinone, 1-amino-4-, -5-, -6-, -7- and -8-chloroanthraquinones, 1-amino-4-, -5- and -8-benzoylaminoanthraquinones, 1-amino-4-, -5- and -8-(chlorobenzoylamino)-anthraquinones and 1-amino-4-, -5- and -8-(4'-phenyl-benzoylamino)-anthraquinones.

1-Aminoanthraquinone derivatives of the above Formula IV (last mentioned) are, for instance 1-amino-4-, -5- and -8-benzoylaminoanthraquinones, 1-amino-4-, -5- and -8-(chlorobenzoylamino)-anthraquinones and 1-amino-4-, -5- and -8-(4'-phenylbenzoylamino)-anthraquinones.

Compounds according to the above Formula II (last mentioned) which are suitable for the purposes of this invention are, for instance, the 2:4:6-trichlorotriazine and derivatives thereof which are monosubstituted by the above defined radical R$_2$, as well as the 2-phenyl-4:6-dichlorotriazine.

The radical R$_2$ may be derived, for example, from the following amines: methyl-, ethyl-, n-propyl-, iso-propyl-, n-butyl-, n-amyl-, n-hexyl-, cyclohexyl-, 1:3-dimethylbutyl-, dimethyl-, diethyl-, dipropyl-, dibutyl- diamyl-, dihexylamines, piperidine, morpholine, aniline, monochloroanilines and nitroanilines, as well as from the following alcohols: methyl-, ethyl-, n-propyl-, isopropyl-, n-butyl, 2-ethyl-n-butyl-, n-hexyl alcohol and phenol.

In order to accelerate the reaction course it may be advantageous to partly or wholly dissolve the compounds of the general Formula II (last mentioned) in an inert solvent. For this purpose, for example, the following solvents are particularly suitable: benzene, monochlorobenzene, toluene, acetone, methyl ethyl ketone and dioxane.

As mineral acid binding agents, for example, sodium hydroxide, potassium hydroxide, sodium carbonate and potassium carbonate are particularly suitable. The mineral acid binding agent is preferably added to the reaction mixture in a certain relation to the formation of hydrochloric acid so that the pH value is preferably maintained to below 7. In practice, it is advantageous to carry out the present process first at a temperature range of 0 to 5° C., then at a temperature between 30 and 40° C. and finally at a temperature range of 70 to 90° C.

Suitable water-soluble salts of sulfuric acid esters are the lithium, sodium, potassium, ammonium and triethanolamine salts.

The salts of sulfuric acid esters of leuco vat dyestuffs of the anthraquinone series of the present invention constitute yellow powders which are readily soluble in water and give on textile materials very fast shades or prints when applied according to techniques usually used for this dyestuff class.

EXAMPLE 30

56 parts (0.3 mols) of cyanuric chloride are dissolved in 200 parts by volume of acetone and the solution is poured onto 600 parts of ice while stirring. Then, while stirring, 160 parts (0.3 mol) of the sodium salt of the sulfuric acid ester of leuco-1-amino-5-benzoylamino-anthraquinone are added to the resultant suspension at a temperature of 0 to 5° C. Simultaneously a 10% aqueous sodium carbonate solution is dropped in in order to maintain the pH value of the reaction solution between 5 and 6. After a stirring for about 20 minutes at 0 to 5° C., the reaction is complete. Then 160 parts (0.3 mol) of the sodium salt of the sulfuric acid ester of leuco-1-amino-4-benzoylaminoanthraquinone are added, the temperature is raised to 30 to 40° C. and the pH value is maintained between 5 and 6 by dropwise addition of a 10% sodium carbonate solution. After about 2 hours stirring at 30 to 40° C. the reaction is complete. After distillation of the acetone from the reaction mass in a vacuo the reaction product is isolated by salting out and filtering and finally dried.

By using the same leuco sulfuric acid ester salts but working in the reverse order of succession the same intermediate product is obtained.

118 parts (0.1 mol) of the intermediate product thus obtained are dissolved in 500 parts of water. Then 20 parts (0.21 mol) of aniline (100% excess) are added and caused to react, under stirring, for 3 hours at 90° C.

The leuco sulfuric acid ester salt is thus obtained in form of a yellow powder which is readily soluble in water and gives very fast, yellow dyeings, when dyed on cotton.

By substituting in the above example 22 parts of 2:4-dichloro-6-diethylaminotriazine for 18 parts of 2:4-dichloro-6-methoxytriazine a similar dyestuff yielding yellow tints is obtained.

When working in the same way as in the above two examples but using, on the one hand, the leuco sulfuric acid ester salts mentioned in the first column of the following table and, on the other hand, the leuco sulfuric acid ester salts mentioned in the third column thereof and the triazine derivatives mentioned in the second column of the following table, the shades mentioned in the fourth column will be obtained on cotton.

Another group of new and non-reactive but valuable dyes are the water-soluble salts of sulfuric acid esters of leuco vat dyestuffs of the anthraquinone series, the

TABLE

| Leuco sulfuric acid ester salt according to the last mentioned Formula III | Triazine derivative according to the last mentioned Formula II | Leuco sulfuric acid ester salt according to the last mentioned Formula IV | Shade on cotton |
|---|---|---|---|
| 1-aminoanthraquinone | 2:4-dichloro-6-aminotriazine | 1-amino-4-benzoylaminoanthraquinone | Orange. |
| Do | 2:4-dichloro-6-(2:3-dimethyl)-butyl-amino-triazine. | 1-amino-5-benzoylaminoanthraquinone | Yellow. |
| Do | 2:4-dichloro-6-anilinotriazine | 1-amino-5-benzoylaminoanthraquinone | Do. |
| Do | 2:4-dichloro-6-cyclohexylaminotriazine | 1-amino-4-benzoylaminoanthraquinone | Do. |
| Do | 2:4-dichloro-6-butoxytriazine | 1-amino-5-benzoylaminoanthraquinone | Orange. |
| Do | 2:4-dichloro-6-(2'-ethylbutoxy)-triazine | 1-amino-4-benzoylaminoanthraquinone | Yellow. |
| Do | 2:4-dichloro-6-methylaminotriazine | 1-amino-8-benzoylaminoanthraquinone | Do. |
| Do | 2:4-dichloro-6-morpholinotriazine | 1-amino-5-benzoylaminoanthraquinone | Do. |
| 1-amino-4-chloroanthraquinone | 2:4-dichloro-6-dimethylaminotriazine | 1-amino-4-benzoylaminoanthraquinone | Orange. |
| 1-amino-5-chloroanthraquinone | 2:4-dichloro-6-anilothrizine | 1-amino-5-benzoylaminoanthraquinone | Yellow. |
| Do | 2:4-dichloro-6-anilinotriazine | 1-amino-4-benzoylaminoanthraquinone | Do. |
| 1-amino-6-chloroanthraquinone | 2:4-dichloro-6-methoxytriazine | 1-amino-4-benzoylaminoanthraquinone | Orange. |
| 1-amino-7-chloroanthraquinone | 2:4-dichloro-6-anilinotriazine | 1-amino-4-benzoylaminoanthraquinone | Yellow. |
| Do | do | 1-amino-5-benzoylaminoanthraquinone | Do. |
| Mixture of 1-amino-6-chloro- and 1-amino-7-chloroanthraquinone. | do | 1-amino-4-benzoylaminoanthraquinone | Orange. |
| 1-amino-8-chloroanthraquinone | 2:4-dichloro-6-methylaminotriazine | 1-amino-8-benzoylaminoanthraquinone | Do. |
| Do | 2:4-dichloro-6-piperidinotriazine | 1-amino-4-benzoylaminoanthraquinone | Red. |
| 1-amino-4-benzoylaminoanthraquinone | 2:4-dichloro-6-anilinotriazine | 1-amino-4-benzoylaminoanthraquinone | Red. |
| Do | do | 1-amino-5-benzoylaminoanthraquinone | Yellow. |
| 1-amino-5-benzoylaminoanthraquinone | 2:4-dichloro-6-phenoxytriazine | 1-amino-5-benzoylaminoanthraquinone | Do. |
| Do | 2:4-dichloro-6-anilinotriazine | 1-amino-8-benzoylaminoanthraquinone | Do. |
| 1-amino-8-benzoylaminoanthraquinone | 2:4-dichloro-6-phenyltriazine | 1-amino-4-(4'-phenylbenzoylamino)-anthraquinone. | Red. |
| 1-amino-4-(4'-phenyl-benzoylamino)-anthraquinone. | | | | and at a pH value of about 4, whereupon the dyestuff formed is isolated and dried.

The leuco sulfuric acid ester salt is thus obtained in form of a yellow powder readily soluble in water. When dyed according to conventional methods on cotton very fast orange dyeings are obtained.

A similar dyestuff giving very fast, orange shades is obtained by using in the above example the corresponding quantity of an ammonia solution instead of aniline.

EXAMPLE 31

18 parts (0.1 mol) of 2:4-dichloro-6-methoxytriazine are dissolved in 50 parts of acetone. The resultant solution is poured onto 200 parts of ice, while stirring, and the suspension formed is stirred while adding, at 30 to 40° C., 46 parts (0.1 mol) of the sodium salt of the sulfuric acid ester of leuco-1-amino-5-chloroanthraquinone, the pH value of the suspension being kept between 5 and 6 by dropwise adding a 10% sodium carbonate solution. After 30 minutes stirring at a temperature between 30 and 40° C. the reaction is complete. Then 53 parts (0.1 mol) of the sodium salt of the sulfuric acid ester of leuco-1-amino-5-benzoylaminoanthraquinone and such a quantity of a 10% sodium carbonate solution are added to the reaction mixture that the pH value thereof is maintained between 5 and 6. The reaction mixture is then stirred for 5 hours at 90° C. After distillation of the acetone in a vacuo the reaction product is isolated by precipitation by means of potassium chloride, filtration and drying.

free acids of which correspond to the following general formula:

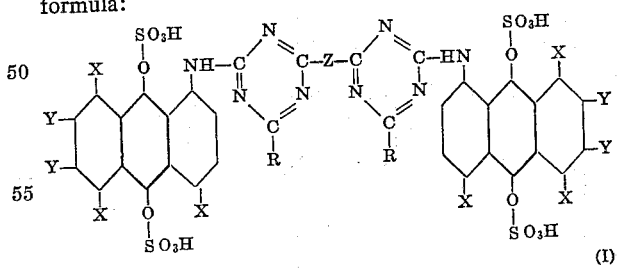

(I)

wherein each X means hydrogen or a chlorine atom or an —NH-aroyl radical, each Y means hydrogen or a chlorine atom, each of the radicals R means an —NH$_2$, —NH-alkyl, —N(alkyl)$_2$, —NH-cyclohexyl, —NH-aryl, —O-alkyl, —O-aryl, phenyl, piperidine or morpholine radical and Z means the radical of a diamine, both the radicals X and Y being the same or different radicals, with the condition that at least 6 hydrogen atoms are attached directly at the carbon atoms of each anthracene nucleus, "alkyl" meaning always lower alkyl radicals containing 1 to 6 carbon atoms.

Suitable radicals Z may be, for instance, the hydrazine, ethylene diamine, 1:3- and 1:4-diaminobenzene, benzidine, chlorobenzidine, tolidine, dianisidine, 4:4'-diaminodiphenylmethane, 4:4' - diaminostilbene, 4:4' - diaminobenzenephenone, 4:4' - diaminodiphenylsulfone, 4:4' - diaminodiphenylamine, 4:4'-diaminodiphenyl urea, 1-amino-4-(4'-aminobenzoyl)-aminobenzene, 1:4-, 1:5- and 1:8-diaminoanthrahydroquinonyl disulfuric acid ester radicals.

The new, water-soluble salts of sulfuric acid esters of leuco vat dyestuffs of the above general Formula I (last mentioned) are prepared by reacting, in any desired order of succession in an aqueous medium containing a mineral acid binding agent, 2 mols of a compound of the general formula:

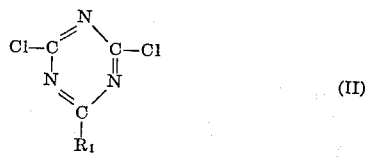

wherein $R_1$ means chlorine or an $-NH_2$, $-NH$-alkyl, $-N(alkyl)_2$, $-NH$-cyclohexyl, $-NH$-aryl, $-O$-alkyl, $-O$-aryl, phenyl, piperidine or morpholine radical, with 2 mols of a compound corresponding, in the form of the free acid, to the following general formula

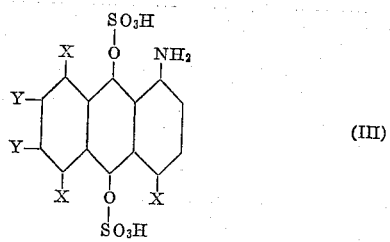

wherein each X and Y has the above meaning, at least 6 hydrogen atoms being attached directly at the carbon atoms of the anthracene nucleus, and with 1 mol of a compound of the general formula $$H-Z-H \quad (IV)$$

wherein Z means the radical of a diamine, with the condition that in those cases, where the resultant reaction products of the above Formula I (last mentioned) contain a chlorine atom in each triazine nucleus, the said reaction products are caused to react with compounds of the following general formula $$H-R_2 \quad (V)$$

wherein R stands for an $-NH_2$, $-NH$-alkyl, $-N(alkyl)_2$, $-NH$-cyclohexyl, $-NH$-aryl, $-O$-alkyl, $-O$-aryl, piperidine or morpholine radical.

The salts of sulfuric acid esters of the above Formula III (last mentioned) are derived from the following 1-aminoanthraquinones:

1-aminoanthraquinone,
1-amino-4-, -5-, -6-, -7- and -8-chloroanthraquinones,
1-amino-4-, -5- and -8-benzoylaminoanthraquinones,
1-amino-4-, -5- and -8-(4'-phenyl-benzoyamino)anthraquinones and
1-amino-4-, -5- and -8-(4'-phenyl-benzoylamino)anthraquinones.

It has been found that 2:4:6-trichlorotriazine, its derivatives monosubstituted by the above defined radical $R_2$ as well as 2:4-dichloro-6-phenyltriazine are especially suitable for the preparation of our new compounds.

The radical $R_2$ may be derived, for example, from the following amines: methyl-, ethyl-, n-propyl-, isopropyl-, n-butyl-, n-amyl-, n-hexyl-, cyclohexyl-, 1:3-dimethyl-butyl-, dimethyl-, diethyl-, dibutyl-, diamyl-, dihexyl-amines, piperidine, morpholine, aniline, monochloranilines and nitroanilines, as well as from the following alcohols: methyl-, ethyl-, n-propyl-, isopropyl-, n-butyl, 2-ethyl-n-butyl-, n-hexylalcohol and phenol.

Diamines falling within the scope of the above Formula IV (last mentioned), which are suitable for the present invention, are for instance hydrazine, ethylene diamine, 1:3- and 1:4-diaminobenzene, benzidine, chlorobenzidine, tolidine, dianisidine, 4:4'-diamino-diphenylmethane, 4:4'-diaminostilbene, 4:4'-diaminobenzophenone, 4:4'-diaminodiphenylsulfone, 4:4'-diaminodiphenylamine, 4:4'-diaminodiphenylurea, 1-amino-4-(4'-aminobenzoyl)-aminobenzene as well as the 1:4-, 1:5- and 1:8-diaminoanthrahydrochinonyl disulfuric acid esters.

In order to accelerate the reaction course it may be advantageous to partly or wholly dissolve the compounds of the general Formula II (last mentioned) in an inert solvent. For this purpose, for example, the following solvents are particularly suitable: benzene, monochlorobenzene, toluene, acetone, methyl ethyl ketone and dioxane.

As mineral acid binding agents, for example, sodium hydroxide, potassium hydroxide, sodium carbonate and potassium carbonate are particularly suitable. The mineral acid binding agent is preferably added to the reaction mixture in a certain relation to the formation of hydrochloric acid so that the pH value is preferably maintained to below 7. In practice, it is advantageous to carry out the present process first at a temperature range of 0 to 5° C., then at a temperature between 30 and 40° C. and finally at a temperature range of 70 to 90° C.

Suitable water-soluble salts of sulfuric acid esters are the lithium, sodium, potassium, ammonium and triethanolamine salts.

The salts of sulfuric acid esters of leuco vat dyestuffs of the anthraquinone series of the present invention constitute yellow powders which are readily soluble in water and give on textile materials very fast shades or prints when applied according to technics usually used for this dyestuff class.

EXAMPLE 32

38 parts (0.2 mol) of cyanuric chloride are dissolved in 150 parts by volume of acetone and the solution is poured onto 400 parts of ice while stirring. Then, while further stirring, 86 parts (0.2 mol) of the sodium salt of the sulfuric acid ester of leuco-1-aminoanthraquinone are added to the resultant suspension at a temperature ranging between 0 and 5° C. Simultaneously a 10% sodium carbonate solution is added drop by drop in order to maintain the pH value of the reaction mixture between 5 and 6. After about 20 minutes stirring at 5° C. the reaction is complete. Then 18 parts (0.097 mol) of benzidine are added to the reaction mass and the temperature is increased to 30 to 40° C. under stirring. The pH value of the reaction mixture is adjusted to about 3 and then maintained between 3 and 4 by further addition of a 10% sodium carbonate solution. After about 2 hours the reaction is complete, whereupon the pH value is adjusted to 8.5 and the acetone is removed by distillation in a vacuo. The reaction product is isolated by salting out and filtering.

126.5 parts (0.1 mol) of the sulfuric acid ester salt thus obtained are dissolved in 600 parts of water and heated for 5 hours at 85–90° C. together with 50 parts of a concentrated aqueous ammonia solution. The reaction product is precipitated by addition of sodium chloride. The resultant precipitate is isolated and dried.

The leuco sulfuric acid ester salt is thus obtained in form of a yellow powder readily soluble in water. When dyed according to conventional methods on cotton, reddish yellow dyeings of excellent light fastness properties are obtained.

EXAMPLE 33

43 parts (0.1 mol) of the sodium salt of the sulfuric acid ester of leuco-1-aminoanthraquinone are dissolved in 500 parts of water and stirred for 2 hours at 30 to 40° C. with 16.5 parts (0.1 mol) of 2:4-dichloro-6-aminotriazine, the pH value of the reaction mixture being maintained between 3 and 4 by the addition of a 10% sodium carbonate solution. Once the reaction is complete, 9.2 parts (0.05 mol) of benzidine are added, the temperature is increased to 85 to 90° C. and the mixture stirred for 5 hours. The dyestuff formed is separated by salting out and dried.

The leuco sulfuric acid ester salt thus obtained is identical with the dyestuff made according to the above Example 1 (last mentioned).

When working in the same way as in the above examples, but using the leuco sulfuric acid ester salt mentioned in the first column of the following table, the triazine derivatives mentioned in the second column of the following table and the diamines listed in the third column thereof, the shades mentioned in the fourth column will be obtained on cotton.

further addition of a 10% sodium carbonate solution the pH value is maintained within the said range. After about 2 to 3 hours the reaction is complete. The dyestuff formed is then precipitated by means of common salt, isolated and dried.

The leuco sulfuric acid ester salt, which is thus obtained as an intermediate product and still possesses two reactive chlorine atoms in the dystuff molecule is then treated with the calculated quantity of aniline at a temperature of 90° C. In this way a very fast dyestuff yielding yellow shades on cotton is obtained.

The same intermediate product is that obtained according to the first paragraph of this example will also be formed, if 0.2 mols of cyanuric chloride are reacted with 0.1 mol of the sodium salt of the sulfuric acid ester of leuco-1:5-diamino-anthraquinone and the reaction product thus obtained is reacted with 0.2 mol of the sodium salt of the sulfuric acid ester of leuco-1-amino-anthraquinone.

TABLE I

| Leuco sulfuric acid ester salt according to Formula III (last mentioned) 0.2 mol | Triazine derivative according to Formula II (last mentioned) 0.2 mol | Diamine according to Formula IV (last mentioned) 0.1 mol | Shade on cotton |
| --- | --- | --- | --- |
| 1-aminoanthraquinone | 2:4-dichloro-6-aminotriazine | Hydrazine | Yellow. |
| Do | do | Ethylene diamine | Do. |
| Do | do | 4:4'-diaminodiphenylamine | Do. |
| Do | do | 1-amino-4-(4'-aminobenzoyl)-amino-benzene | Do. |
| Do | do | 1:4-diaminobenzene | Do. |
| Do | 2:4-dichloro-6-methylaminotriazine | Benzidine | Do. |
| Do | 2:4-dichloro-6-isopropylaminotriazine | 4:4'-diaminodiphenylurea | Do. |
| Do | 2:4-dichloro-6-piperidinotriazine | 4:4'-diaminodiphenylmethane | Do. |
| Do | 2:4-dichloro-6-anilinotriazine | 1:3-diaminobenzene | Do. |
| Do | 2:4-dichloro-6-methoxytriazine | 4:4'-diaminostilbene | Do. |
| Do | 2:4-dichloro-6-butoxytriazine | Benzidine | Do. |
| 1-amino-4-chloroanthraquinone | 2:4-dichloro-6-anilinotriazine | do | Do. |
| 1-amino-5-chloroanthraquinone | 2:4-dichloro-6-dibutylaminotriazine | do | Do. |
| 1-amino-6-chloroanthraquinone | 2:4-dichloro-6-anilinotriazine | do | Do. |
| 1-amino-7-chloroanthraquinone | do | do | Red. |
| 1-amino-8-chloroanthraquinone | do | do | Red. |
| 1-amino-4-benzoylaminoanthraquinone | do | Dianisidine | Red. |
| Do | 2:4-dichloro-6-morpholinotriazine | Benzidine | Red. |
| Do | 2:4-dichloro-6-cyclohexylaminotriazine | do | Yellow. |
| Do | 2:4-dichloro-6-phenoxytriazine | Tolidine | Do. |
| 1-amino-5-benzoylaminoanthraquinone | 2:4-dichloro-6-hexylaminotriazine | Benzidine | Do. |
| Do | 2:4-dichloro-6-anilinotriazine | 4:4'-diaminodiphenylsulfone | |
| 1-amino-8-benzoylaminoanthraquinone | 2:4-dichloro-6-phenyltriazine | | |

EXAMPLE 34

38 parts (0.2 mol) of cyanuric chloride are dissolved in 150 parts of acetone and the resultant solution is poured onto 400 parts of ice while stirring. 86 parts (0.2 mol) of the sodium salt of the sulfuric acid ester of leuco-1-aminoanthraquinone are then added under stirring to the resultant suspension, the pH value of the said suspension being maintained between 3 and 5 by addition of a 10% sodium carbonate solution. After about 20 minutes the reaction is complete. 44.4 parts (0.1 mol) of the sodium salt of the sulfuric acid ester of leuco-1:5-diaminoanthraquinone are added to the reaction mass and the whole is stirred and heated to 30 to 40° C. By a The following Table II shows further examples of dyestuffs obtainable with sulfuric acid ester salts of leuco-diaminoanthraquinones of the above Formula IV (last mentioned), a triazine of the Formula II (last mentioned) and a leuco sulfuric acid ester of the Formula III (last mentioned):

TABLE II

| Leuco sulfuric acid ester salt of formula III (last mentioned) 0.2 mol | Triazine derivative of formula II (last mentioned) 0.2 mol | Leuco sulfuric acid ester salt of the diamine of Formula IV (last mentioned) 0.1 mol | Shade on cotton |
| --- | --- | --- | --- |
| 1-aminoanthraquinone | 2:4-dichloro-6-methoxytriazine | 1:4-diaminoanthraquinone | Orange. |
| Do | 2:4-dichloro-6-anilinotriazine | 1:5-diaminoanthraquinone | Yellow. |
| Do | 2:4-dichloro-6-aminotriazine | 1:8-diaminoanthraquinone | Do. |
| Do | 2:4-dichloro-6-phenoxytriazine | 1:5-diaminoanthraquinone | Do. |
| 1-amino-4-chloroanthraquinone | 2:4-dichloro-6-cyclohexylaminotriazine | do | Do. |
| 1-amino-6-chloroanthraquinone | 2:4-dichloro-6-morpholinotriazine | do | Do. |
| 1-amino-7-chloroanthraquinone | 2:4-dichloro-6-piperidinotriazine | 1:8-diaminoanthraquinone | Orange. |
| 1-amino-8-chloroanthraquinone | 2:4-dichloro-6-anilinotriazine | 1:5-diaminoanthraquinone | Red. |
| 1-amino-4-benzoylaminoanthraquinone | 2:4-dichloro-6-phenyltriazine | 1:4-diaminoanthraquinone | Orange. |
| Do | 2:4-dichloro-6-ethylaminotriazine | do | Yellow. |
| 1-amino-5-benzoylaminoanthraquinone | 2:4-dichloro-6-anilinotriazine | 1:5-diaminoanthraquinone | Do. |
| Do | 2:4-dichloro-6-diethylaminotriazine | do | Do. |
| 1-amino-8-benzoylaminoanthraquinone | | | |

Still another group of valuable new water-soluble salts of sulfuric acid esters of leuco vat dyestuffs which are nonreactive are those of the anthraquinone series, the free acids of which corresponds to the following general formula

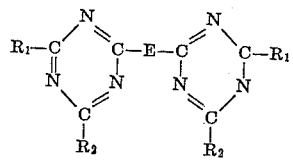

wherein E means the radical of the 1:4-, 1:5- or 1:8-diaminoanthrahydrochinonyl disulfuric acid ester of the general formula:

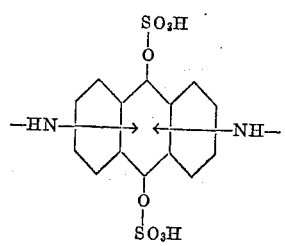

each radical $R_1$ means an $-NH_2$, $-NH$-alkyl, $-N(alkyl)_2$ $-NH$-cyclohexyl, $-NH$-aryl, $-O$-alkyl, $-O$-aryl, piperidine or morpholino radical and each radical $R_2$ means an $NH_2$, $-NH$-alkyl, $-N$-$(alkyl)_2$, $-NH$-cyclohexyl, $-NH$-aryl, $-O$-alkyl, $-O$-aryl, phenyl, piperidine or morpholine radical, both the radicals $R_1$ and both the radicals $R_2$ being the same or different radicals and "alkyl" meaning always lower alkyl radicals containing 1 to 6 carbon atoms.

They can be prepared by reacting, in an aqueous medium and in the presence of a mineral acid binding agent, 2 mols of a compound of the general formula:

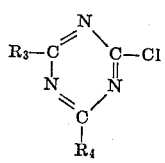

wherein $R_3$ means chlorine or an $-NH_2$, $-NH$-alkyl, $-N(alkyl)_2$, $-NH$-cyclohexyl, $-NH$-aryl, $-O$-alkyl, $-O$-aryl, piperidine or morpholine radical and $R_4$ means chlorine or an $-NH_2$, $-NH$-alkyl, $-N(alkyl)_2$, $-NH$-cyclohexyl, $-NH$-aryl, $-O$-alkyl, $-O$-aryl, phenyl, piperidine or morpholine radical, with 1 mol of a compound of the following general formula:

wherein E has the above meaning, with the condition that in those cases, where the resultant reaction products of the above Formula I contain two or four chlorine atoms in the triazine nuclei, the said reaction products are caused to react with compounds of the following general formula:

wherein $R_1$ means an $-NH_2$, $-NH$-alkyl, $-N(alkyl)_2$, $-NH$-cyclohexyl, $-NH$-aryl, $-O$-alkyl, $-O$-aryl, piperidine or morpholine radical.

The salts of sulfuric acid esters of the above Formula II (last mentioned) are derived from 1:4-diaminoanthraquinone, 1:5 - diaminoanthraquinone and 1:8 - diaminoanthraquinone.

It has been found that 2:4:6 - trichlorotriazine, its derivatives either monosubstituted by one radical $R_1$ or disubstituted by two radicals $R_1$, as well as 2:4 - dichloro-6-phenyltriazine and derivatives thereof which are monosubstituted by one radical $R_1$ are especially suitable for the preparation of our new compounds, $R_1$ having the same meaning as defined above.

The radical $R_1$ may be derived, for example, from the following amines: methyl-, ethyl-, n-propyl-, isopropyl-, n-butyl-, n-amyl-, n-hexyl-, cyclohexyl-, 1:3-dimethylbutyl-, dimethyl-, diethyl-, dibutyl-, diamyl-, dihexylamines, piperidine, morpholine, aniline, monochloranilines and nitroanilines, as well as from the following alcohols: methyl-, ethyl-, n-propyl-, isopropyl-, n-butyl-, 2-ethyl-n-butyl-, n-hexylalcohol and phenol.

In order to accelerate the reaction course it may be advantageous to partly or wholly dissolve the compounds of the general Formula III (last mentioned) in an inert solvent. For this purpose, for example, the following solvents are particularly suitable: benzene, monochlorobenzene, toluene, acetone, methyl ethyl ketone and dioxane.

As mineral acid binding agents, for example, sodium hydroxide, potassium hydroxide, sodium carbonate and potassium carbonate are particularly suitable. The mineral acid binding agent is preferably added to the reaction mixture in a certain relation to the formation of hydrochloric acid so that the pH value is preferably maintained to below 7. In practice, it is advantageous to carry out the present process first at a temperature range of 0 to 5° C., then at a temperature between 30 and 40° C. and finally at a temperature range of 70 to 90° C.

Suitable water-soluble salts of sulfuric acid esters are the lithium, sodium, potassium, ammonium and triethanolamine salts.

The salts of sulfuric acid esters of leuco vat dyestuffs of the anthraquinone series of the present invention constitute yellow powders which are readily soluble in water and give on textile materials very fast shades or prints when applied according to technics usually used for this dyestuff class.

EXAMPLE 35

38 parts (0.2 mol) of cyanuric chloride are dissolved in 150 parts of acetone. The resultant solution is poured, while stirring, onto 400 parts of ice. Stirring is continued and 44 parts (0.1 mol) of the sodium salt of the sulfuric acid ester of leuco-1:5 - diaminoanthraquinone are added at a temperature between 0 and 5° C. to the resultant suspension. The pH value of the reaction mixture is kept during this addition between 3 and 4 by dropwise adding thereto a 10% sodium carbonate solution. After a stirring for 2 hours at 0 to 5° C. the reaction is complete, the reaction product thus formed being then isolated and dried.

74 parts of the leuco sulfuric acid ester salts thus obtained as an intermediate product are dissolved in 600 parts of water and caused to react with 40 parts (0.43 mols) of aniline. The temperature is kept first at 30 to 40° C. for 6 hours and is then raised to 85 to 90° C. for 6 hours. A very fast dyestuff giving yellow shades is thus obtained.

A similar leuco sulfuric acid ester salt yielding yellow tints on cotton is obtained, if the sulfuric acid ester salt of leuco-1:8-diaminoanthraquinone is substituted for the sulfuric acid ester salt of leuco-1:5-diaminoanthraquinone used in the above example.

When working in the same way as in the above example, but using the leuco sulfuric acid ester salts mentioned in the first column of the following table and the triazine derivatives mentioned in the second column of the following table, the shades mentioned in the third column will be obtained on cotton.

TABLE

| Leuco sulfuric acid ester salt of Formula II (last mentioned) 0.1 mol | Triazine derivative of Formula III (last mentioned) 0.2 mol | Shade on cotton |
|---|---|---|
| 1:4-diaminoanthraquinone | 2-chloro-4:6-dibutylaminotriazine | Red. |
| Do | 2-chloro-4:6-dimethoxytriazine | Red. |
| Do | 2-chloro-4-methoxy-6-piperidinotriazine | Red. |
| Do | 2-chloro-4-amino-6-anilinotriazine | Red. |
| Do | 2-chloro-4-phenyl-6-morpholinotriazine | Red. |
| Do | 2-chloro-4:6-dianilinotriazine | Red. |
| Do | 2-chloro-4:6-diaminotriazine | Orange. |
| 1:5-diaminoanthraquinone | do | Yellow. |
| Do | 2-chloro-4:6-di-(2:3-dimethyl)-butyl-aminotriazine | Do. |
| Do | 2-chloro-4-ethylamino-6-anilinotriazine | Do. |
| Do | 2-chloro-4:6-dimethoxytriazine | Do. |
| Do | 2-chloro-4-phenoxy-6-anilinotriazine | Do. |
| Do | 2-chloro-4-butoxy-6-anilinotriazine | Do. |
| Do | 2-chloro-4:6-dicyclohexylaminotriazine | Do. |
| Do | 2-chloro-4-(2-ethyl)-butoxy-6-anilinotriazine | Do. |
| Do | 2-chloro-4:6-di-isopropylaminotriazine | Do. |
| Do | 2-chloro-4:6-di-diethylaminotriazine | Orange. |
| Do | 2-chloro-4:6-diaminotriazine | Yellow. |
| 1:8-diaminoanthraquinone | 2-chloro-4:6-dimethylaminotriazine | Do. |
| Do | 2-chloro-4-phenyl-6-anilinotriazine | Do. |
| Do | 2-chloro-4:6-dianilinotriazine | |

What is claimed is:
1. A water-soluble salt of the leuco sulfuric acid ester of the formula

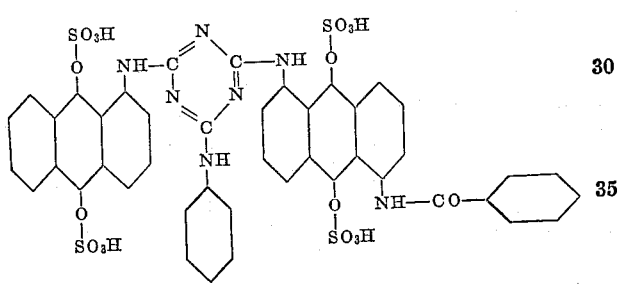

2. A water-soluble salt of the leuco sulfuric acid ester of the formula

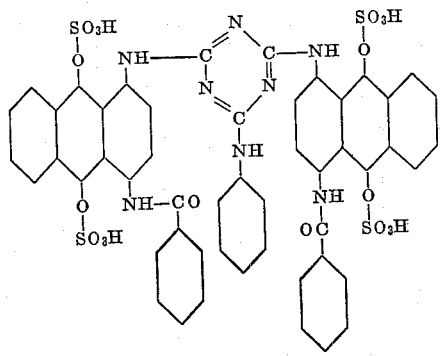

3. A water-soluble salt of the leuco sulfuric acid ester of the formula

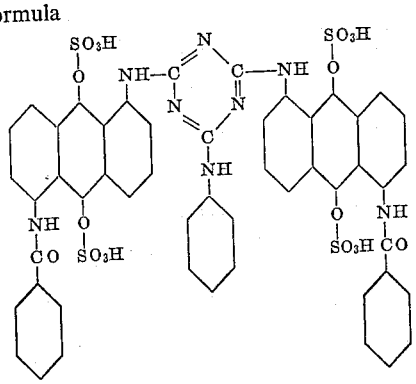

4. A water-soluble salt of the leuco sulfuric acid ester of the formula

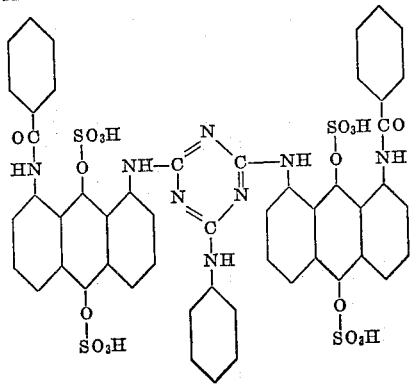

5. A water-soluble salt of the leuco sulfuric acid ester of the formula

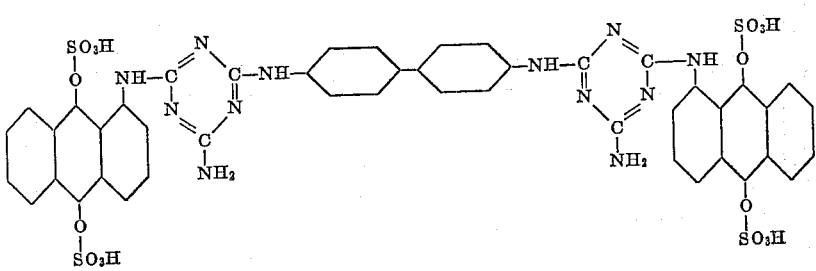

6. A water-soluble salt of the leuco sulfuric acid ester of the formula
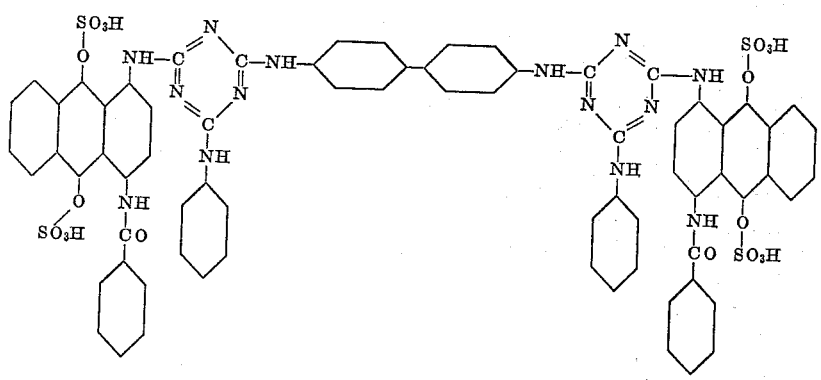
7. A water-soluble salt of the leuco sulfuric acid ester of the formula
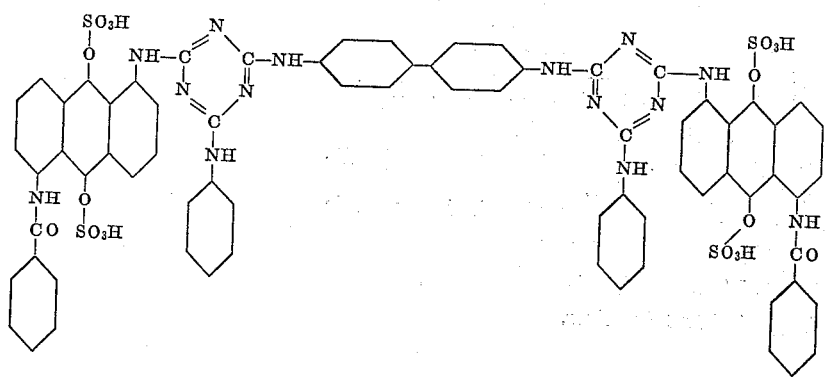
8. A water-soluble salt of the leuco sulfuric acid ester of the formula
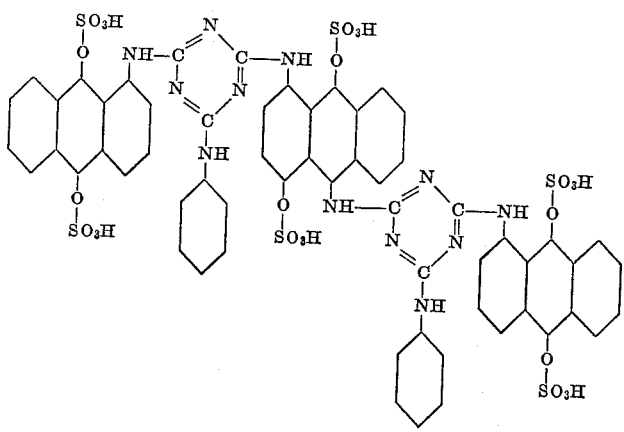

9. A water-soluble salt of the leuco sulfuric acid ester of the formula

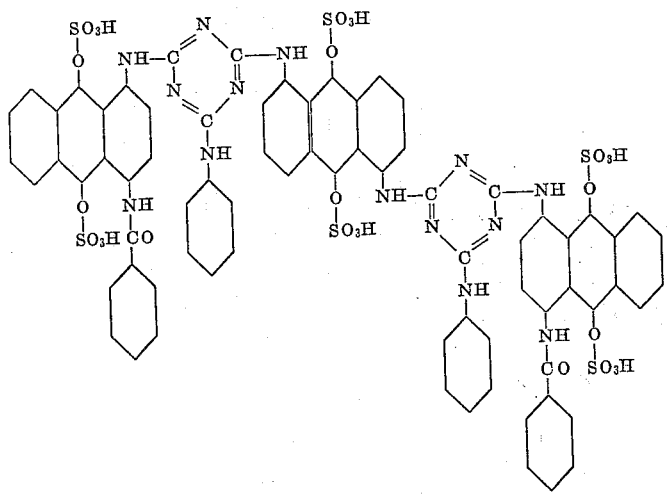

References Cited
UNITED STATES PATENTS

| | | | |
|---|---|---|---|
| 1,437,783 | 12/1922 | Steinbuch et al. | 260—249 |
| 1,523,308 | 1/1925 | Steinbuch et al. | 260—249 |
| 1,633,474 | 3/1928 | Ackermann | 260—249 |
| 1,867,125 | 7/1932 | Wieners et al. | 260—249 |
| 1,994,602 | 3/1935 | Wieners | 260—249 |
| 2,403,226 | 7/1946 | Lecher et al. | 260—249 XR |
| 2,693,473 | 11/1954 | Moergeli | 260—249 XR |
| 2,716,645 | 8/1955 | Von | 260—249 |
| 3,163,551 | 12/1964 | Staeuble et al. | 260—249 |

OTHER REFERENCES

Chemical Abstracts Decennial Subject Index (1947–1956), p. 4397, copyright 1960.

Venkataraman, "Synthetic Dyes" vol. 1, Academic Press, New York (1952), pp. 272–3.

WALTER A. MODANCE, *Primary Examiner.*

J. M. FORD, *Assistant Examiner.*

UNITED STATES PATENT OFFICE
CERTIFICATE OF CORRECTION

Patent No. 3,341,539                  September 12, 1967

Max Staeuble et al.

It is hereby certified that error appears in the above numbered patent requiring correction and that the said Letters Patent should read as corrected below.

In the heading to the printed specification, lines 12 and 13, for "Claims priority, application Switzerland, Mar. 24, 1961, 3,518/61, 3,520/61, 3,521/61" read -- Claims priority, application Switzerland, July 18, 1960, 8,172/60; Mar. 24, 1961, 3,518/61, 3,519/61, 3,520/61, 3,521/61; June 12, 1961, 6,893/61 --; column 41, for that portion of the formula in claim 8 reading

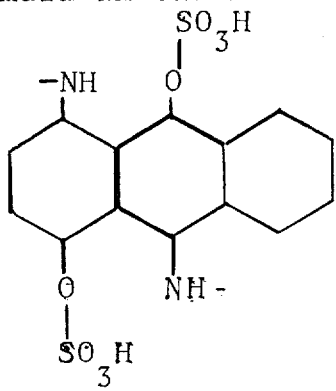 read 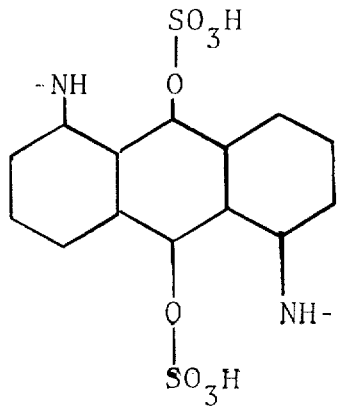

Signed and sealed this 29th day of October 1968.

(SEAL)
Attest:

EDWARD M. FLETCHER, JR.                 EDWARD J. BRENNER
Attesting Officer                      Commissioner of Patents